US012753344B2

(12) United States Patent
Birk et al.

(10) Patent No.: US 12,753,344 B2
(45) Date of Patent: Oct. 6, 2026

(54) METHOD FOR HEAT ENHANCED REDUCTIVE BIOREMEDIATION

(71) Applicant: Tersus Environmental, LLC, Wake Forest, NC (US)

(72) Inventors: Gary M. Birk, Wake Forest, NC (US); David F. Alden, Worcester, MA (US); John Sankey, Vancouver (CA); Guilherme Mascalchi de Figueiredo, São Paulo (BR)

(73) Assignee: TERSUS ENVIRONMENTAL, LLC, Wake Forest, NC (US)

( * ) Notice: Subject to any disclaimer, the term of this patent is extended or adjusted under 35 U.S.C. 154(b) by 329 days.

(21) Appl. No.: 18/109,641

(22) Filed: Feb. 14, 2023

(65) Prior Publication Data

US 2023/0272281 A1 Aug. 31, 2023

(51) Int. Cl.
*B09C 1/08* (2006.01)
*C09K 17/50* (2006.01)

(52) U.S. Cl.
CPC ................ *C09K 17/50* (2013.01); *B09C 1/08* (2013.01)

(58) Field of Classification Search
None
See application file for complete search history.

(56) References Cited

U.S. PATENT DOCUMENTS

| | | | | |
|---|---|---|---|---|
| 9,309,136 | B2 | 4/2016 | Archibald et al. | |
| 10,384,246 | B2 | 8/2019 | Flanders et al. | |
| 10,688,545 | B2 | 6/2020 | Flanders et al. | |
| 11,577,231 | B2 | 2/2023 | Birk et al. | |
| 2015/0360982 | A1 | 12/2015 | Archibald et al. | |
| 2017/0333961 | A1* | 11/2017 | Song | B03B 5/34 |
| 2019/0351468 | A1 | 11/2019 | Flanders et al. | |

FOREIGN PATENT DOCUMENTS

| | | | | |
|---|---|---|---|---|
| CA | 2206949 | * | 5/2003 | |
| CA | 2206949 C | * | 5/2003 | B09B 3/45 |
| CA | 3109644 | * | 2/2020 | |
| CA | 3109644 A1 | * | 8/2021 | B09C 1/002 |
| CN | 103990645 | * | 8/2014 | |
| JP | 2019030822 | * | 2/2019 | |
| JP | 6823040 | * | 1/2021 | |

OTHER PUBLICATIONS

EPA "Introduction to In Situ Bioremediation of Groundwater". Office of Solid Waste and Emergency Response. Dec. 2013. (Year: 2013).*
SDA "Task tm" Tersus Environmental. Apr. 19, 2022. (Year: 2022).*
NIST Chemistry WebBook, SRD 69. Isopropyl Alcohol. 2023. (Year: 2023).*
PubChem. Soybean Oil. 2025 (Year: 2025).*
Maymo-Gatell et al.; "Isolation of a Bacterium That Reductively Dechlorinates Tetrachloroethene to Ethene" Science (1997) 276:1568-1571.
Ma et al., "Biodiesel Production: A Review" Bioresour. Technol. 1999 Published by Elsevier Science, 70 (1999), pp. 1-15.
Wei et al., "Electron Acceptor Interactions Between Organohalide-Respiring Bacteria: Cross-Feeding, Competition, and Inhibition" Department of Chemical Engineering and Applied Chemistry, University of Toronto, Toronto, ON, Canada, 2016.(https://doi.org/10.1007/978-3-662-49875-0_13), pp. 283-308.
Yusuf et al., "Overview on the Current Trends in Biodiesel Production; Energy Convers. Manage"., doi:10.1016/j.enconman.2010.12.004, 52 (2011), pp. 2741-2751.
ESTCP Technical Report: White Paper, "A Review of Biofouling Controls for Enhanced in Situ Bioremediation of Groundwater"; Oct. 2005, pp. 1-55.
Chawla et al., "Effect of Alcohol Cosolvents on the Aqueous Solubility of Trichloroethylene", Proceedings of the 2001 Conference on Environmental Research, pp. 52-66. (https://engg.ksu.edu/HSRC/01Proceed/docs/52.pdf).
Abbah et al., "Effect of Reaction Temperature on the Yield of Biodiesel From Neem Seed Oil" American Journal of Energy Science (AJER). 3 (2016), pp. 16-20.
Istiningrum et al., "Effect of reaction temperature on biodiesel production from waste cooking oil using lipase as biocatalys" 2017 AIP Conference Proceedings 1911, 020031 (2017); https://doi.org/10.1063/1.5016024, pp. 020031-1 to 020031-4.
Environmental Security Technology Certification Program, Protocol for Enhanced In Situ Bioremediation Using Emulsified Edible Oil; Arlington, VA, May 2006, pp. 1-99.
Sawyer et al., Chemistry for Environmental Engineering. McGraw-Hill Inc; 1994, Chapter 4: pp. 114-211, Chapter 5: pp. 212-313, and Chapter 6: pp. 315-359.
Costanza et al., "Fate of TCE in heated Fort Lewis soil". Environ. Sci. Technol. 2009, 43 (3), 909-914, DOI: 10.1021/es802508x., pp. 1-6.
EPA (United States Environmental Protection Agency) "Engineered Approaches to In Situ Bioremediation of Chlorinated Solvents: Fundamentals and Field Applications" EPA 542-R-00-008, Jul. 2000, pp. 1-144.
EPA, (United States Environmental Protection Agency) CLU-IN, Website, 2023. CLU-IN "Bioremediation, Anaerobic Bioremediation (direct)" Website, https://clu-in.org/techfocus/default.focus/sec/bioremediation/cat/anaerobic_bioremediation_(direct), pp. 1-12.

(Continued)

*Primary Examiner* — Sheng H Davis
(74) *Attorney, Agent, or Firm* — The Belles Group, P.C.

(57) ABSTRACT

A method for treating an environmental medium is disclosed. A heat source with a heat exchanger is provided aboveground in proximity to the environmental medium to be treated. A mixture is heated to a temperature below a boiling point of the mixture. The mixture consists of a vegetable oil, an emulsifier, and water. The heated mixture and an alkaline compound catalyst are introduced into the contaminated environmental medium. The alkaline compound is potassium hydroxide or sodium hydroxide. The alkaline compound is dissolved in an alcohol in an amount ranging from 0.1 to 5% of the alkaline compound to form an alkyl oxide solution.

20 Claims, 21 Drawing Sheets

(56) References Cited

OTHER PUBLICATIONS

ESTCP "Principles and Practices of Enhanced Anaerobic Bioremediation of Chlorinated Solvents" ESTCP Report: Principles and Practices of Enhanced Anaerobic Bioremediation of Chlorinated Solvents. ESTCP Project ER-200627. (2004), pp. 1-457.
ESTCP "Protocol for Enhanced In Situ Bioremediation Using Emulsified Edible Oil" ESTCP Project ER-200221., (2006), pp. 1-100.
ESTCP (Addendum to Principles and Practices Manual) "Loading Rates and Impacts of Substrate Delivery for Enhanced Anaerobic Bioremediation" ESTCP Project ER-200627 (2010), pp. 1-39.
Freedman et al., "Variables Affecting the Yields of Fatty Esters from Transesterified Vegetable Oils" Journal of the American Oil Chemists' Society 61(10), Oct. 1984, pp. 1638-1643.
ITRC "In Situ Bioremediation of Chlorinated Ethene: DNAPL Source Zones", Interstate Technology and Regulatory Council, Technical/Regulatory Guidance, Jun. 2008, pp. 1-138.
Kaya et al., "Impact of Fixed Nitrogen Availability on Dehalococcoides mccartyi Reductive Dechlorination Activity", Environmental Science & Technology 2019 53 (24), 2019., 14548-14558 DOI: 10.1021/acs.est.9b04463, pp. 1-11.
Löffler et al., "*Dehalococcoides mccartyi* gen. nov., sp nov., obligately organohalide-respiring anaerobic bacteria relevant to halogen cycling and bioremediation, belong to a novel bacterial class, Dehalococcoidia classis nov., order Dehalococcoidales ord. nov and family Dehalococcoidaceae fam. nov., within the phylum Chloroflexi" International Journal of Systematic and Evolutionary Microbiology (2013), pp. 63, 625-635, DOI 10.1099/ijs.0.034926-0.
Marcet et al., "Impacts of low-temperature thermal treatment on microbial detoxification of tetrachloroethene under continuous flow conditions" Water Res. Nov. 15, 2018;145:21-29. doi: 10.1016/j.watres.2018.07.076. Epub Jul. 31, 2018. PMID: 30114555, pp. 1-29.
Stroo et al., "Chlorinated Ethene Source Remediation: Lessons Learned" Environmental Science & Technology 2012, 46 (12) ,© 2012 American Chemical Society, pp. 6438-6447. https://doi.org/10.1021/es204714w, pp. 1-10.
Stroo et al., "Bioaugmentation for Groundwater Remediation" SERDP and ESTCP Remediation Technology Monograph Series Series Editor: C. Herb Ward, Rice University, Copyright Springer Science+Business Media New York 2013, DOI 10.1007/978-1-4614-4115-1, pp. 4-39.
Yan et al., "Guided cobalamin biosynthesis supports Dehalococcoides mccartyi reductive dechlorination activity" Downloaded from https://royalsocietypublishing.org/ on Feb. 24, 2023, pp. 1-10.
Yang et al., "Resilience and recovery of Dehalococcoides mccartyi following low pH exposure" FEMS Microbiology Ecology, vol. 93, Issue 12, Dec. 2017, fix130, https://doi.org/10.1093/femsec/fix130, pp. 1-9.

* cited by examiner

Overview of common chlorinated solvent dechlorination pathways and organisms responsible.

Time = 0.8 days

Time = 1 day

Time = 1.8 days

Time = 8 days

Time = 10 days

Time = 30 days

Time = 80 days

Time = 90 days

*$R_i$ = fatty acid chain of the triglyceride (this will vary for each type of vegetable oil)*

*$R_{ii}$ = in the case of methanol, this will be methyl group ($CH_3$)*

| Reagents | | Catalyst | | Products |
|---|---|---|---|---|
| Triglyceride | ⟶ | KOH or NaOH Dissolved in Alcohol | ⟶ | Fatty Acid Esters, Salts of the Carboxylic Acids, and Glycerol |

METHOD FOR HEAT ENHANCED REDUCTIVE BIOREMEDIATION

CROSS-REFERENCE TO RELATED APPLICATION

This application is a continuation-in-part of U.S. patent application Ser. No. 16/797,617, entitled "Enhanced Reduction Bioremediation Method Using In-situ Alcoholysis" and filed Feb. 21, 2020, the contents of which is hereby incorporated herein in its entirety.

FIELD OF THE DISCLOSURE

The present disclosure generally relates to a method for treating environmental medium having recalcitrant contaminants, and more particularly relates to a method for treating environmental medium having recalcitrant compounds using heat enhanced reductive bioremediation.

BACKGROUND

A current major environmental issue is soil and groundwater contamination. Contamination results from the use of various current or former processes practiced and specific materials used in those processes. In the United States both Federal and State governments have regulations governing hazardous organic and inorganic contaminants in environmental medium since the 1970's. These regulations have promulgated action levels and clean-up standards for numerous organic and inorganic contaminants. The regulations that govern these contaminants in environmental medium provide protocols to investigate and identify the extent of contamination and to evaluate the human health and ecological risk posed because of their release to the environment. The regulations also set out guidelines to develop remedial action alternatives for reducing or eliminating the risk posed by the regulated contaminants, and selection and implementation of remedial measures to achieve cleanup goals to restore the environmental medium so that it can be put back to a productive and safe use.

Regulated organic contaminants in environmental media include both volatile and semi-volatile organic compounds (VOCs and SVOCs). Chlorinated solvents are organic chemicals that contain chlorine atoms in their molecular structure. They have been widely used in various industries, especially as solvents for metallic parts cleaning processes, and are a common class of chemicals creating contaminated groundwater sites. Once in the environment, these contaminants present an environmental situation that must be managed to comply with regulations, protect human health and the environment and potentially restore productive and safe use to hazardous sites.

There is a need to provide methods for accelerating, optimizing, and reducing cleanup costs associated with bioremediation, at-least of halogenated straight-chain and aromatic hydrocarbons; organic chlorate and perchlorate derivatives; explosives such as nitroaromatics, nitramines, nitrate esters, and energetic munitions residuals; nitrates; oxidized metals; and other contaminants in groundwater.

SUMMARY

A method for treating an environmental medium is disclosed. A heat source with a heat exchanger is provided above a ground in proximity to the environmental medium to be treated. A mixture is heated to a temperature below a boiling point of the mixture. The mixture consists of a vegetable oil, an emulsifier, and water. The heated mixture and an alkaline compound catalyst are introduced into the contaminated environmental medium. The alkaline compound is potassium hydroxide or sodium hydroxide. The alkaline compound is dissolved in an alcohol in an amount ranging from 0.1 to 5% of the alkaline compound to form an alkyl oxide solution.

BRIEF DESCRIPTION OF THE DRAWINGS

The features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

Figure 1:
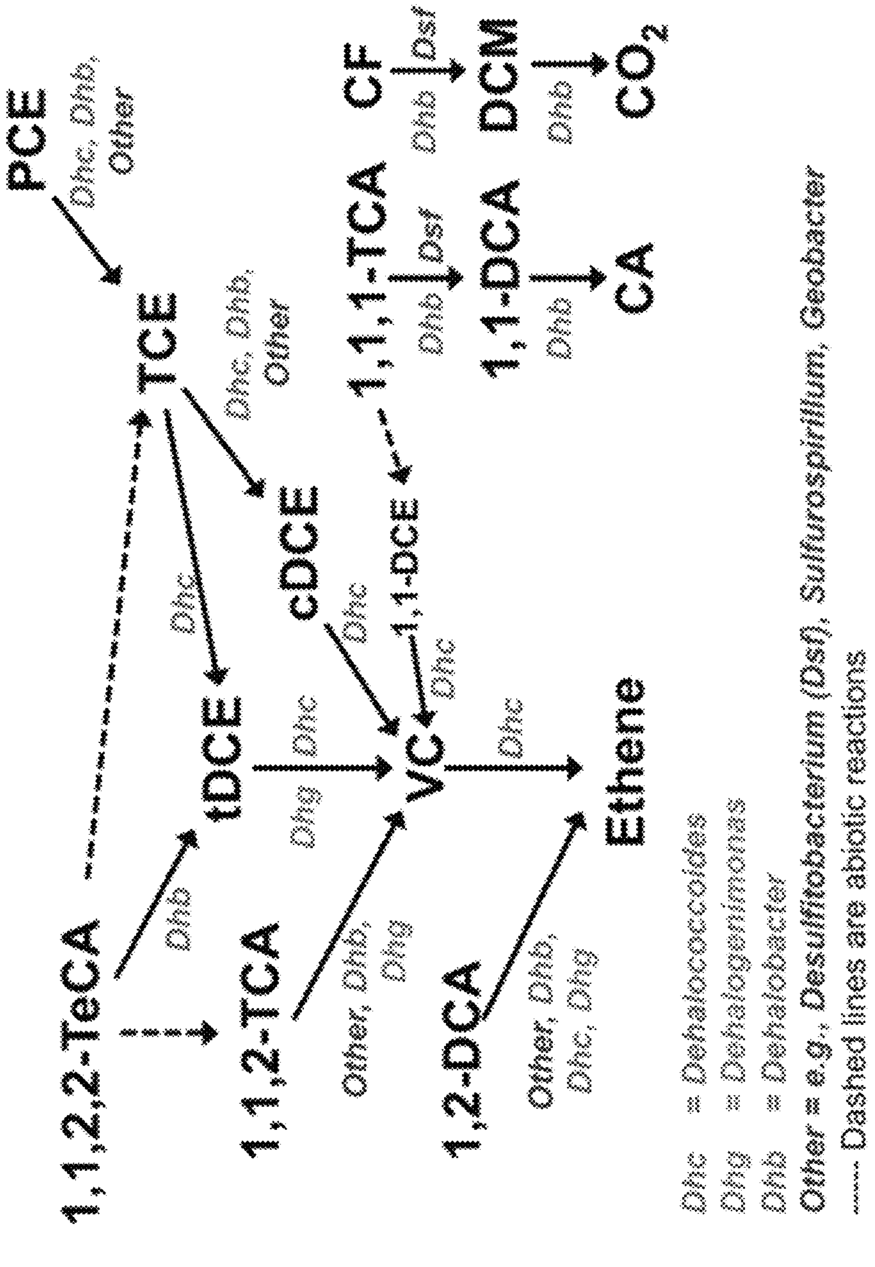
FIG. 1 illustrates a state of the art common chlorinated solvent dechlorination pathways and organisms responsible therein.

Further, persons skilled in the art to which this disclosure belongs will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those of ordinary skill in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications to the disclosure, and such further applications of the principles of the disclosure as described herein being contemplated as would normally occur to one skilled in the art to which the disclosure relates are deemed to be a part of this disclosure.

It will be understood by those skilled in the art that the foregoing general description and the following detailed description are exemplary and explanatory of the disclosure and are not intended to be restrictive thereof.

The terms "comprises", "comprising", or any other variations thereof, are intended to cover a non-exclusive inclusion, such that a process or method that comprises a list of steps does not include only those steps but may include other steps not expressly listed or inherent to such a process or a method. Similarly, one or more devices or sub-systems or elements or structures or components preceded by "comprises . . . a" does not, without more constraints, preclude the existence of other devices, other sub-systems, other elements, other structures, other components, additional devices, additional sub-systems, additional elements, additional structures, or additional components. Appearances of the phrase "in an embodiment", "in another embodiment" and similar language throughout this specification may, but do not necessarily, all refer to the same embodiment.

Unless otherwise defined, all technical and scientific terms used herein have the same meaning as commonly understood by one of ordinary skill in the art to which this disclosure belongs. The system, methods, and examples provided herein are illustrative only and not intended to be limiting.

The disclosed method provides heat enhanced reductive bioremediation of recalcitrant organic and inorganic compounds in groundwater. The capital costs are lowered by using a composition that is heated prior to adding to the environmental medium that is to be treated.

The disclosed method provides an in-situ alcoholysis remediation to reduce contaminant concentrations in the soil and groundwater by enabling the generation of both soluble and slowly fermenting electron donors required for the anaerobic remediation of organohalide compounds contaminating the soil and the groundwater. A water-soluble oil solvent mixture and a catalyst are introduced into the targeted contaminated area so that:

(a) the fatty acids of the triglyceride molecule are cleaved and attached to the alkyl group (the part made of carbon and hydrogen) of the alcohol to form fatty acid alkyl esters, carboxylic acids/salts, and glycerol; and (b) to increase fatty acid subsurface distribution, minimize biofouling, and provide aquifer buffering while minimizing saponification and the formation of soap scum.

The disclosed method temporarily increases the temperature of the composition to increase the reaction rate and yield of fatty acid alkyl esters. Further, the disclosed method temporarily increases aquifer temperatures to an optimal range to stimulate organohalide-respiring bacteria that mineralize chlorinated solvents. The composition is consumed by microbes in the groundwater and produces products those act as electron donors for reducing the contaminant into an innocuous derivative thereof.

Chlorinated solvents of the environmental medium may include, but are not limited to, halogenated volatile organic compounds (CVOCs), for example, perchloroethylene (PCE), trichloroethene (TCE), trichloroethane (TCA), dichloroethene (DCE), and vinyl chloride (VC); non-halogenated straight-chain hydrocarbons; and halogenated aromatic hydrocarbons. The preferred International Union of Pure and Applied Chemistry (IUPAC) name for PCE is tetrachloroethene. PCE is also known under the systematic name perchloroethene and tetrachloroethylene. DCE refers to one of several isomeric forms of the organochloride with the molecular formula $C_2H_2Cl_2$; cis-1,2-DCE, trans-1,2-DCE and 1,1-DCE.

Perchlorate; explosives such as nitroaromatics, nitramines, nitrate esters, and energetic munitions residuals; nitrates; oxidized metals; and other contaminants also appear on lists of contaminants frequently detected at hazardous waste sites. Once in the environment, these contaminants present an environmental situation that must be managed to comply with regulations, protect human health and the environment and potentially restore productive and safe use to hazardous sites.

Remediation of VOCs and SVOC in environmental media is a complex problem with limited cost-effective solutions to reduce their impacts on human health and ecological risk. Recent advances in anaerobic biodegradation processes allow remediation of difficult conditions including saturated or variably saturated soils, contaminant source zones (i.e., by dense non-aqueous phase liquid or DNAPL) and low-permeability soils (i.e., contaminated clays) at a much lower-cost than conventional methods such as excavation, pump-and-treat, in-situ chemical oxidation (ISCO), or in-situ thermal remediation (ISTR).

Enhanced reductive bioremediation is often used to modify chemical, physical, and biological conditions in environmental media to facilitate degradation of a broad range of contaminants under anaerobic conditions to harmless end products (ESTCP, 2004). Contaminants include chloroethenes, chloroethanes, chloromethanes, chlorinated cyclic hydrocarbons, oxidized metals (e.g., hexavalent chromium (Cr[VI]), selenium (VI), uranium [VI]), various energetics (e.g., perchlorate, RDX, TNT), and nitrate.

In case of anaerobic reductive dichlorination, the bacteria gain energy and grow as one or more chlorine atoms on a chlorinated hydrocarbon are replaced with hydrogen in an environment devoid of oxygen. The contaminant (i.e., chlorinated compound, typically a chlorinated solvent) serves as the electron acceptor and hydrogen serves as the electron donor (EPA, 2000). Anaerobic reducing conditions are created by the addition of a readily assimilable carbon source, organic substrate, to the environmental media (ESTCP, 2006; ESTCP, 2010). The assimilable carbon source is used as food by native or introduced microbes and provides the hydrogen needed by dechlorinating organisms (ITRC, 2005).

In the disclosed process, the assimilable carbon source provides carbon and electrons that microorganisms initially use to deplete the aquifer of dissolved oxygen (DO) and other electron accepters including nitrate, sulfate, and ferric iron, which lowers the oxidation-reduction potential (ORP), thereby creating the conditions for reductive dichlorination to occur (EPA, CLU-IN, Website, 2023). When highly reducing conditions are established, many contaminants relatively rapidly degrade to non-regulated compounds. An overview of common chlorinated solvent dichlorination pathways and organisms responsible is provided in FIG. 1 (Wei et al., 2016).

Electron donors are divided into three principal groups based on their physical characteristics. The groups include:

i. Soluble donors: highly soluble aqueous compounds. Examples include lactate and fatty acids, butyrate, methanol, ethanol, benzoate, molasses, and high fructose corn syrup.

ii. Slow-release donors: compounds with low solubility limits and greater viscosity than soluble donors. Examples include neat vegetable oil, emulsified vegetable oil (EVO), and water miscible oil (vegetable oil and emulsifier mixture).

iii. Solid Substrates: solid phase substrates. Examples include mulch, compost, and chitin.

Interest has grown towards using slow release electron donors in enhanced bioremediation (also referred to as biostimulation) systems for treating contaminants in groundwater. Biostimulation is a bioremediation method that promotes favorable microbial activity. There are many types of organisms in soils and aquifers and dominance of one microbial process over another is influenced by several factors. These factors include availability, type and concentration of electron acceptors and electron donors, temperature, pH, concentration and nature of chlorinated solvents or other volatile organic compounds, and other potentially inhibitory contaminants or elements. *Dehalococcoides mccartyi* (Dhc), *Dehalobacter* (Dhb), and *Dehalogenimonas* (Dhg) are among a genus of strict anaerobic organohalide respiring bacteria that obtain energy via the oxidation of hydrogen and subsequent reductive dehalogenation of chlorinated ethenes (Maymo-Gatell et al., 1997). Biostimulation for chlorinated solvents thus aims to create favorable conditions for these bacteria and generally involves the addition of electron donors.

Emulsified vegetable oil (EVO) has been used as a carbon source to stimulate organohalide-respiring bacteria that mineralize chlorinated solvents. Vegetable fats (triglycerides) can anaerobically ferment to hydrogen and low-molecular weight fatty acids by common subsurface microorganisms. Under anaerobic fermentation, a two-step process occurs where the ester linkages between the glycerol and the fatty acids are hydrolyzed releasing free fatty acids and glycerol to solution. The released glycerol degrades to 1,3-propanediol and subsequently to acetate. The saturated fatty acids further breakdown by beta-oxidation resulting in the formation of two molecules of hydrogen ($H_2$), and one molecule of acetate ($C_2H_3O^{2-}$). The original molecule of acid appears as a new acid derivative with two less carbon atoms (Sawyer et al., 1994).

$$C_nH_{2n}O_2 + 2H_2O \rightarrow 2H_2 + C_2H_3O^{2-} + H^+ + C_{n-2}H_{2n-4}O_2$$

As per Sawyer et al., Due to successive oxidation at the beta carbon atom, long-chain fatty acids are whittled into progressively shorter fatty acids and acetic acid and subsequently four hydrogen atoms are released from saturated fatty acids for each acetic acid unit produced. Unsaturated fatty acids undergo the same general process but release two atoms of hydrogen for each acetic acid unit (ESTCP, 2006).

Distribution of the correct type of fatty acids is essential to anerobic reductive dichlorination. While acetate functions as a long lasting electron donor, it will not migrate significantly downgradient of the injection point. While acetate will stimulate PCE to TCE to cDCE degradation, it will not stimulate cDCE to VC to ethene. Hydrogen is required as the electron donor to stimulate cDCE to VC to ethene. It is generally recognized that hydrogen is produced from the fermentation of longer chain fatty acids (e.g., linolenic acid, propionate, butyrate, etc.). Thus, the distribution of the correct type of fatty acids is important to the efficacy and overall economics of these systems.

Vegetable oils are hydrophobic at a molecular level because they contain a fraction that causes it to repel water. To improve the distribution of vegetable oils in aquifers, some suppliers of electron donors add emulsifiers to the oil. An emulsifier is a surfactant that allows the oil to disperse with water in the form of micelles. The emulsifier coats droplets within an emulsion and prevents them from coming together, or coalescing. The electron donor is packaged as an oil-in-water emulsion containing 25 to 50% water. Water is thus inherently purchased during EVO sales. The current practice is to provide the substrate as an EVO that contains 25 to 50% water. The substrate is purchased from a supplier and shipped to the contaminated site. Typical dilution ratios range from one-part EVO to four parts water to one-part EVO to 100 parts water. Additional chase water is often added to aid with the distribution of EVO in aquifers. The costs of the electron donor may be a significant fraction of total process costs. Thus, the selection of an efficient and low-cost electron donor is important to the efficacy and overall economics of these systems.

Biostimulation can decrease groundwater pH with consequences for Dhc reductive dichlorination activity (Yang et al., 2017). An aquifer pH between 6 and 8.5 standard units is generally required for dichlorination to ethene (Rowlands, 2004).

Figure 2:
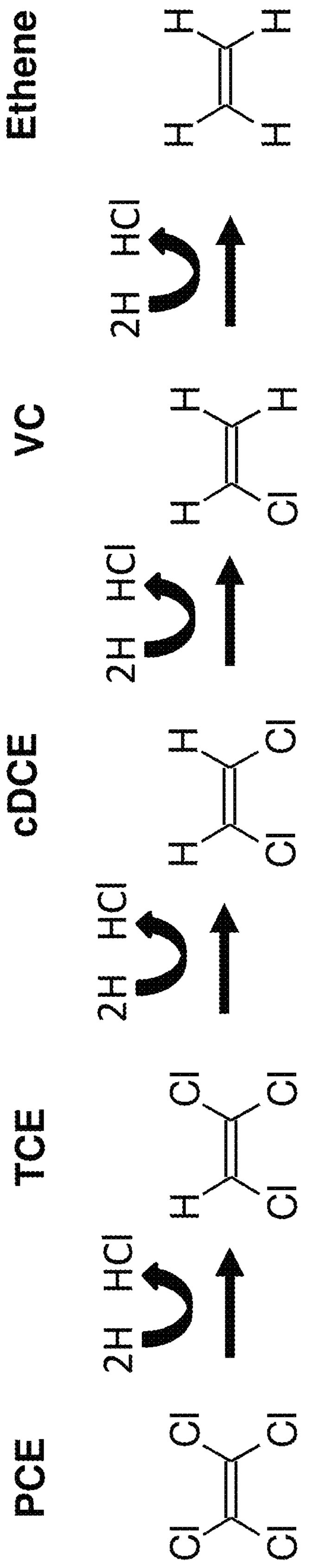
FIG. 2 illustrates anaerobic reductive dichlorination that produces hydrochloric acid (HCl)

Most microbial processes associated with the breakdown of electron donors tend to lower pH. Fermentation of electron donors added to the environmental media liberates hydrogen ions and generates acidic byproducts such as carbon dioxide and volatile fatty acids. Adding electron donor to groundwater with pH values lower than 6.0 will likely keep or further drop the aquifer's pH as fermentation processes increase acidity. FIG. 2 illustrates that reductive dichlorination produces hydrochloric acid (HCl). For each mole of chlorine removed from the chlorinated hydrocarbon, one mole of HCl is produced. The figure illustrates that the complete reductive dichlorination of one mole of PCE to ethene will generate four moles of HCl.

For example, site with trichloroethylene (TCE) at 1% of aqueous solubility (14,720 μg/L) will generate the following acidity:

Given:

TCE Formula: $C_2HCl_3$

TCE Molar Mass: 131.4 g/mol 14,720 μg/L=0.01472 g/L

HCl Molar Mass: 36.46 g/mol

TCE reductive dechlorination to ethane:

$$3H_2 + C_2HCl_3 \Rightarrow C_2H_4 + 3HCl$$

One mole of TCE forms three moles of hydrochloric acid. Therefore:

$$\frac{0.01472\ \frac{g}{L}}{131.4\ g/mol} = 1.12 \times 10^{-4}\ mol\ \ TCE/L$$

-continued $$1.12\times10^{-4}\ \text{mol}\ TCE/\text{L}\times3\ \text{mole}\ \frac{\text{HCl}}{\text{Mol}}TCE = 3.36\times10^{-4}\ \text{mol HCl/L}$$

$$3.36\times10^{-4}\ \text{mol}\frac{\text{HCl}}{\text{L}}\times36.46\ \frac{\text{g}}{\text{mol}} = 0.012\ \text{gHCl/L}$$

As a result, biostimulation efforts should include methods to maintain optimal pH. It may be necessary to add bases (alkali) or buffering agents to mitigate a decrease in pH. Sites with low pH are more likely to have the reductive dichlorination process stall and accumulate cDCE/VC.

Accordingly, the pH control poses a major challenge for the in-situ bioremediation of chlorinated solvents, particularly when aquifers lack enough natural buffering capacity. Although adding electron donor in excess would intuitively minimize intervention costs, the excessive production of acidity is counterproductive. Slowly fermenting products such as EVO better protect a pH drop rather than soluble electron donors. That said, a uniform distribution of EVO is difficult due to high losses to sorption, obligating practitioners to inject EVO in excess and losing pH and permeability control.

Based on site specific conditions, additional-materials such as zero-valent metal, iron sulfide reagents, vitamins, yeast-extracts, and biological cultures may be necessary. Anaerobic organohalide respiring bacteria cultures such as Dhc strains require vitamin B12 (Yan et al, 2013). It is reported that optimal dechlorination and growth occur at vitamin B12 concentrations ranging from 25 to 50 micrograms per liter (25 μg/L) (Stroo et al., 2013). Vitamin B12 is not commonly found in simple substrates such as EVO and at considerably lesser amounts in micronutrient blends. Biostimulation benefits from adding an exogenous nitrogen (N) source (e.g., ammonium, NH4+). Recent work has shown that addition of NH4+ increases cDCE-to-ethene dichlorination rates about 5-fold (Kaya et al., 2019). The addition of nutrients to injection wells can promote excessive biomass growth that can reduce aquifer permeability.

The formation of soap scum after an EVO injection amended with an alkali is a common problem. Saponification is the process involving the hydrolysis of triglycerides (EVO) with and alkali leading to the formation of fatty acid metals salts (soap).

Figure 3:
FIG. 3 illustrates biofouling material collected from groundwater monitoring wells after an EVO injection.
Figure 4A:
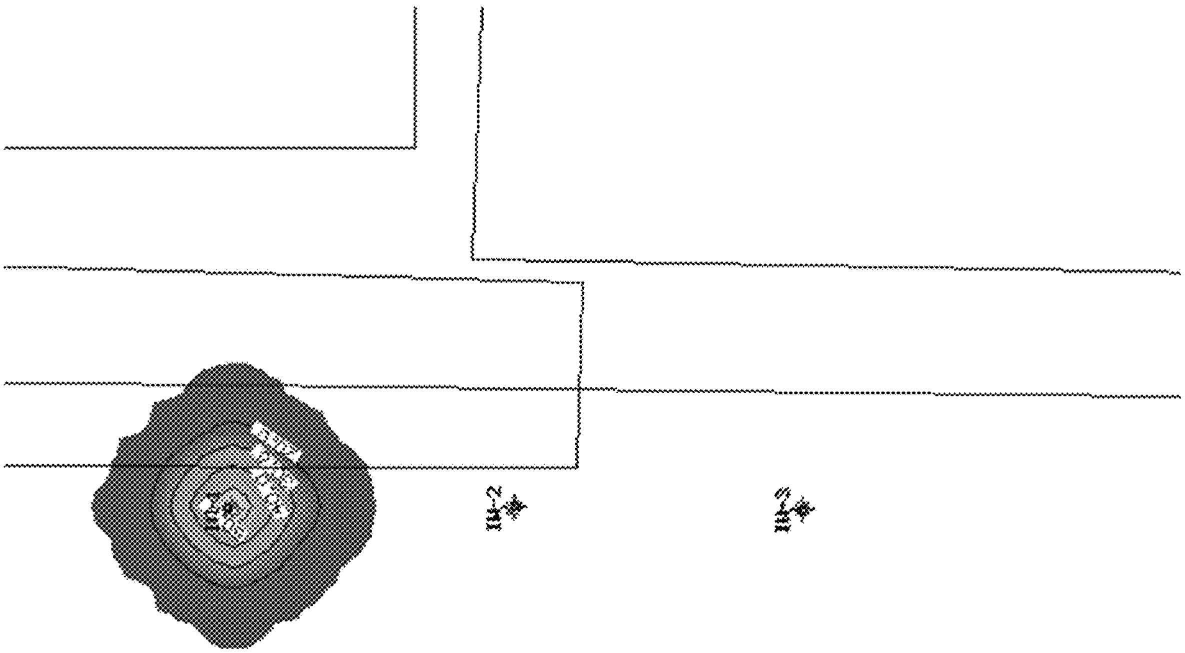
FIGS. 4*a* through 4*h* illustrates modeling results for a 12 hour injection event of 75 $m^3$ of water heated to 90° C. into 3 injection wells at a flow rate of 150 $m^3$/d and an aquifer hydraulic conductivity K of 1×10-2 cm/s. 492352
Figure 4B:
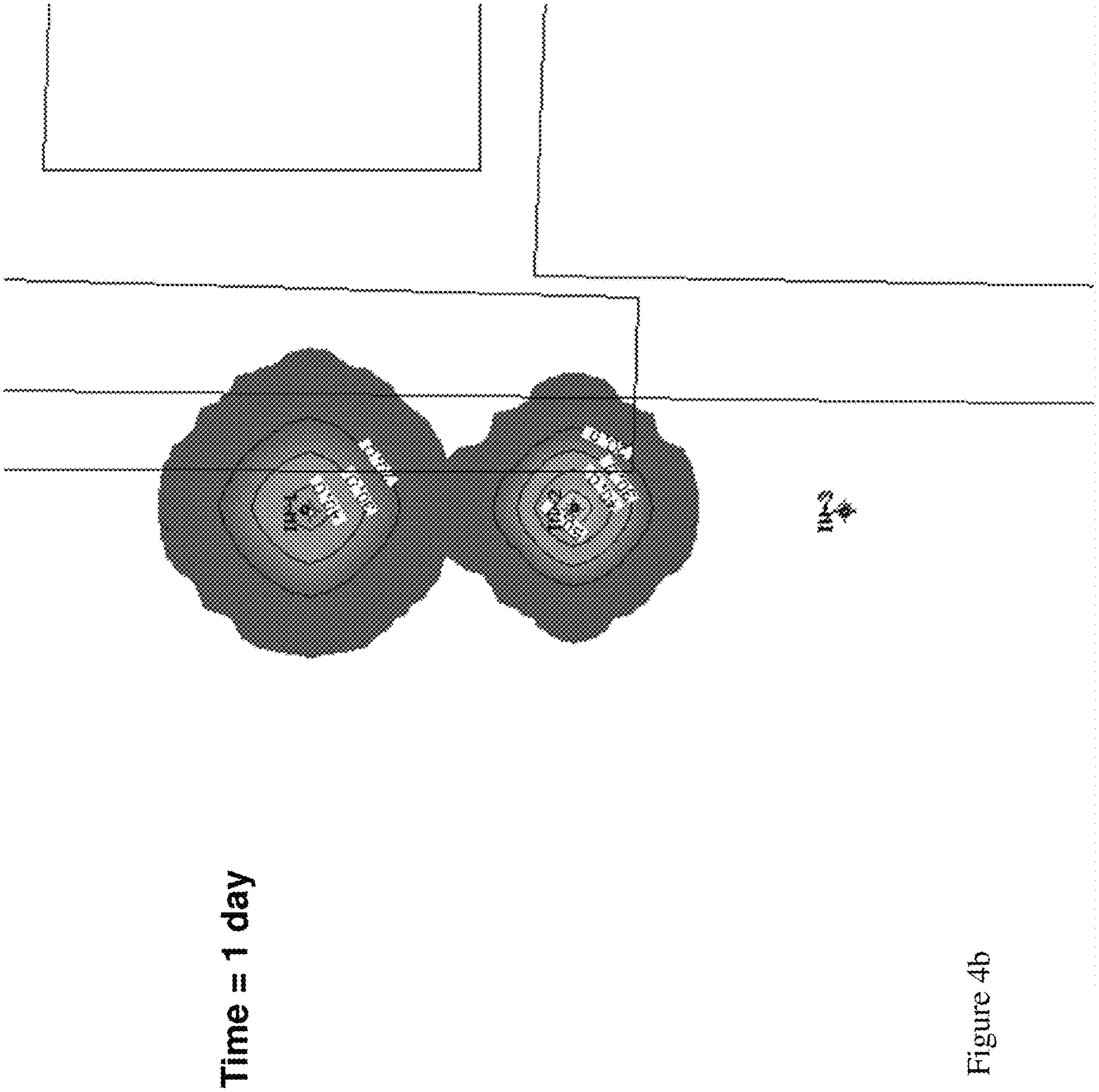
Figure 4C:
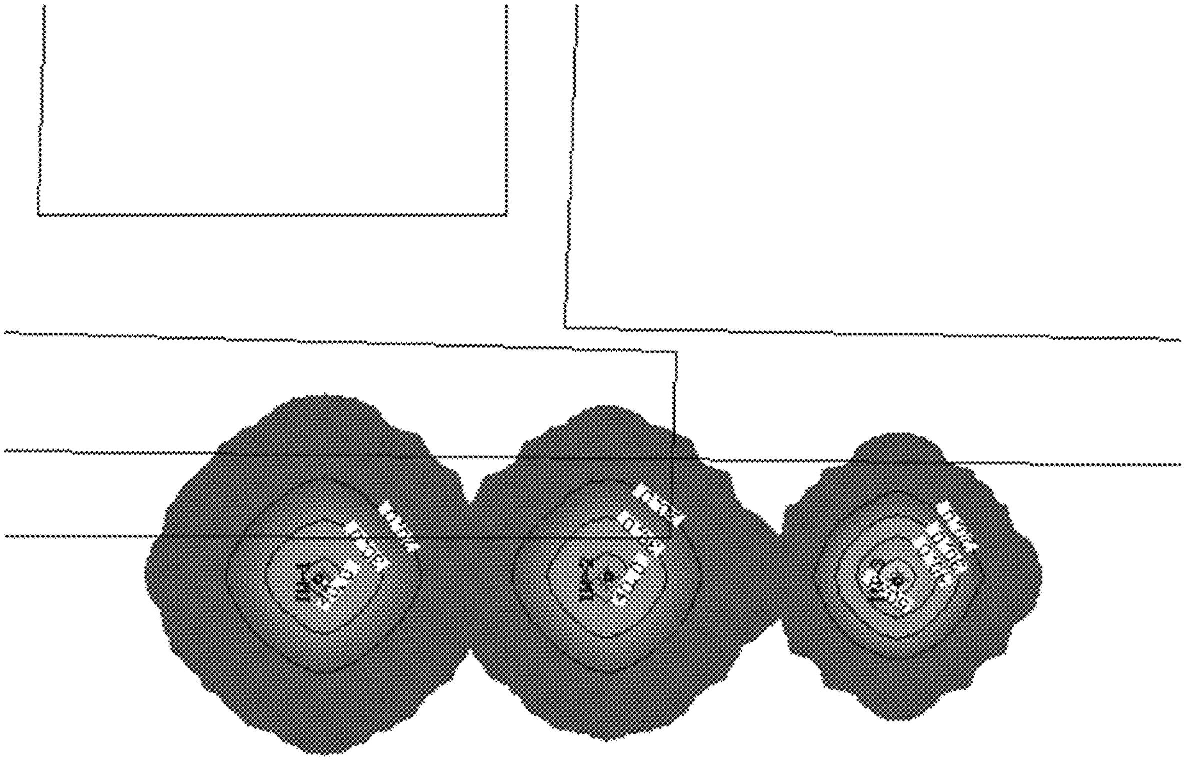
Figure 4D:
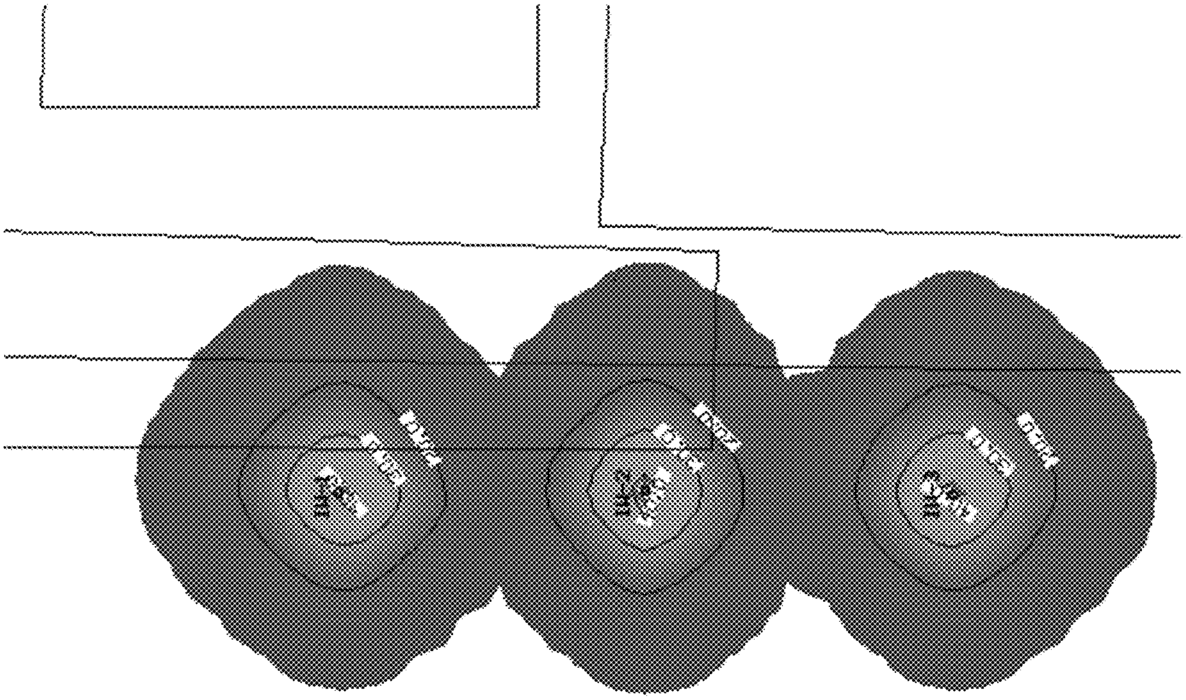
Figure 4E:
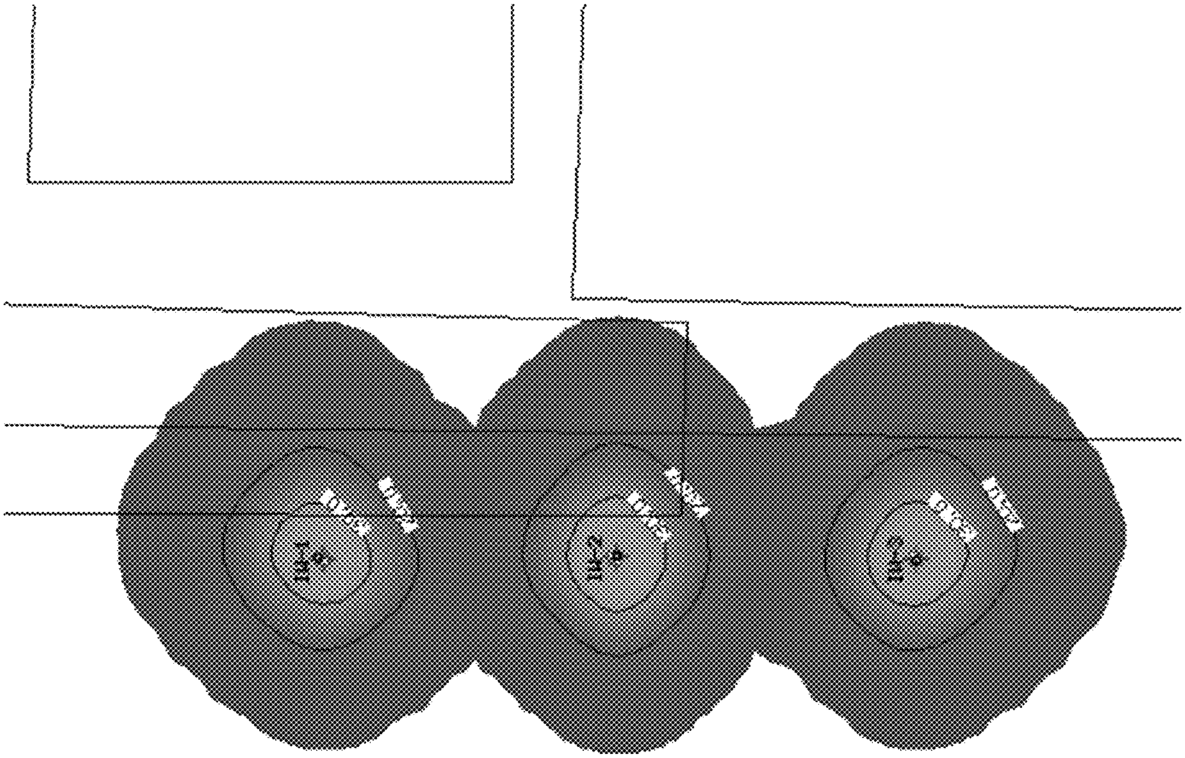
Figure 4F:
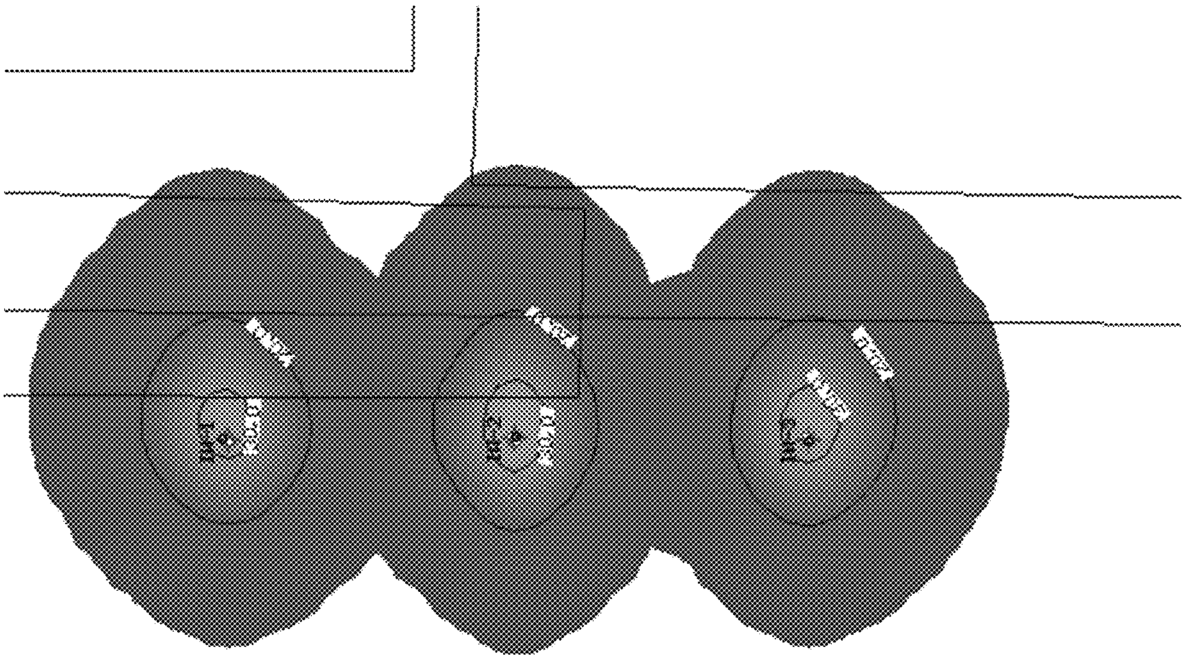
Figure 4G:
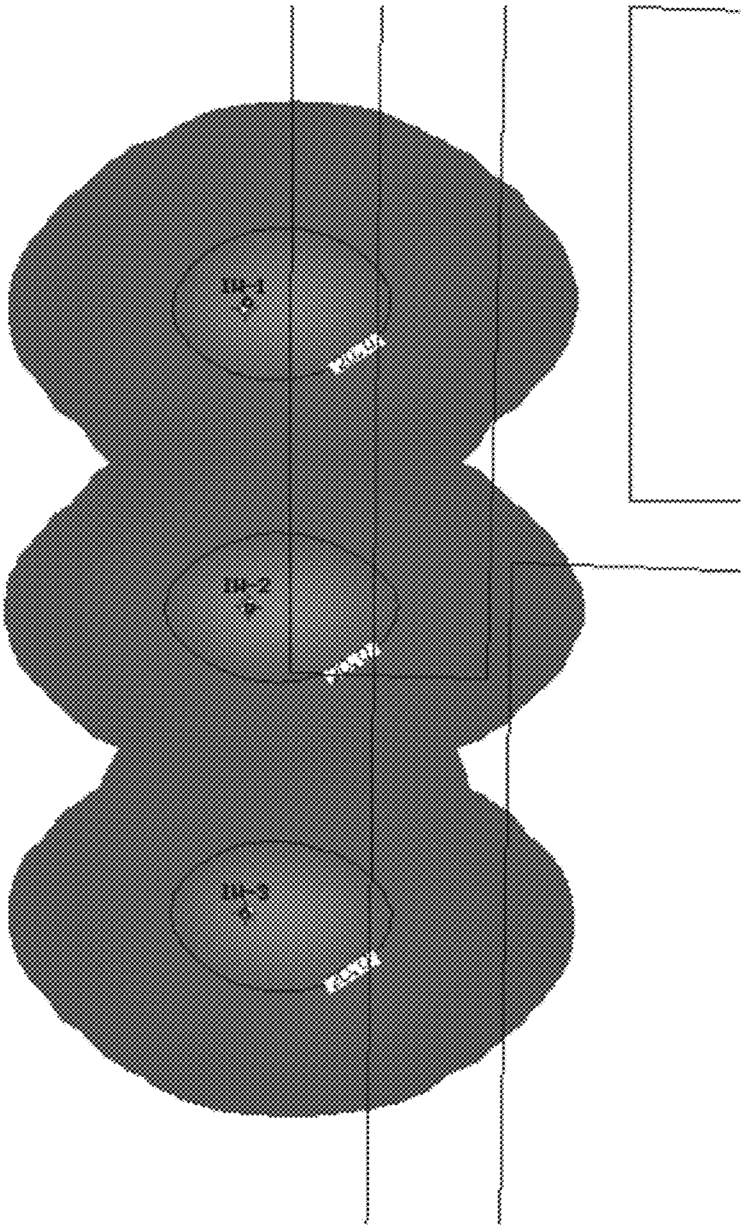
Figure 4H:
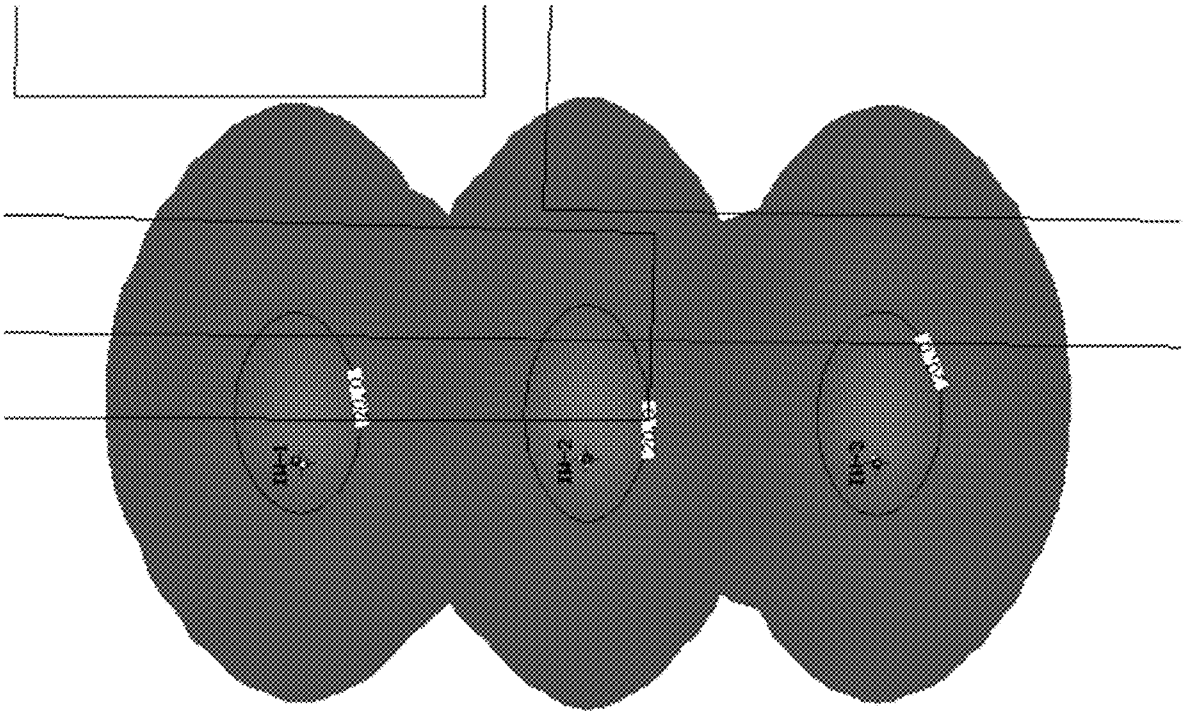

Biofouling after an EVO injection is a common problem as oil creates high residual saturations that aren't easy to wash-off. Biofouling of the injection wells can occur as hydrophobic oil sorbs to solid materials in the vicinity of the injection point creating a residual film that stimulates biomass growth. It may also result from bacteria using oxygen, nitrate, iron, manganese, or sulfate as electron acceptors coincidentally with degradation of the target contaminants. The addition of EVO as an electron donor promotes a wide range of microbial metabolic activity that can cause biofilm formation and well biofouling (ESTCP, 2005). Samples of biofouling material collected from groundwater monitoring wells after an EVO injection are shown in FIG. 3.

Avoiding formation of soap scum and biofouling issues is important during remediation as they can be costly to the project due to impairment of constructed electron-donor injection wells or the reduction in the aquifer's hydraulic permeability which in turn limits groundwater flow or the addition of remediation products.

Combining ISTR with enhanced reductive bioremediation is an attractive site remediation method that has the potential to enhance contaminant degradation and reduce cleanup costs compared to conventional standalone remediation technologies (Marcet et al, 2018). ISTR can release natural organic material at sites with humic material in the formation increasing levels of readily available carbon, stimulating subsequent dechlorination and reducing the competition for electron donors.

Heating the environmental medium can enhance reductive bioremediation. Enhanced reductive bioremediation occurs under anaerobic conditions, in the absence of free oxygen. Dissolved Oxygen (DO) is the concentration of oxygen gas incorporated in water. Warm water holds less DO than cold water, reducing the amount of electron donors needed to deplete the aquifer of DO.

Typical ambient aquifer temperature is about 15° C. Low temperature ISTR may be combined with enhanced reductive bioremediation as microorganisms can degrade contaminants at moderate temperatures (<40-45° C.). It is further reported that little biotic or abiotic destruction of chloroethenes normally occurs at temperatures above 50° C. (Stroo et al., 2013; Costanza et al., 2009). Löffler et al. identified an optimal range of 25-30° C. for neutrophilic, strictly hydrogenotrophic Dhc strains (Löffler et al., 2013). Dhc strains are essential bacteria for the reduction of cis-DCE and VC to nontoxic ethene.

ISTR techniques include Thermal Conduction Heating (TCH), Electrical Resistance Heating (ERH), and Steam Enhanced Extraction (SEE). TCH is the process of heat flowing from the hot end of an iron rod (heater well) to the cold end. The heat moves out radially from the heater wells and contaminants in environmental medium also heat up at the same time. TCH is used to treat contaminants that have boiling points higher than water such as SVOCs. Contaminants with boiling points less than water such as PCE, TCE and other VOCs can be treated with ERH or SEE. ERH uses the flow of alternating current electricity to heat the environmental medium and evaporate contaminants. SEE involves the injection of steam into the environmental media and the removal of contaminants and vapors from recovery wells. ERH and SEE can only heat the environmental media to the boiling point of water as they are both limited by the presence of water or soil moisture. TCH and ERH requires boiling off water within the treatment zone. In highly transmissive groundwater aquifers, ISTR may require additional groundwater management measures such as installation of a groundwater dewatering system or a hydraulic barrier to minimize the amount of water flowing into the treatment zone. SEE may also be required to augment TCH or ERH in highly transmissive aquifers for complete heating and treatment of both tight zones and permeable zones. Subsequent extraction and capture organic contaminants with subsequent treatment is essential to ISTR.

ISTR requires a significant amount of subgrade heating equipment, vapor recovery and treatment, and temperature and pressure monitoring components commissioned and deemed fully operational prior to starting the system. This infrastructure requires a significant amount of labor, time, and capital to install. At many sites, the subsurface will not heat uniformly. Distinct thermal signatures, as measured by the temperature monitoring systems, are often produced. Portions of the aquifer through which faster groundwater flow occurs may heat more slowly than other zones.

There has been recent progress in closed-loop in-situ heating systems. Flanders, et al., teaches of a method for heating of target contaminant by thermal conduction using borehole heat exchangers and below ground geothermal storage tanks. The time and expense to install closed-loop in-situ heating systems can be cost prohibitive based on advances in deploying electron donors using in-situ alcoholysis. Thus, the selection of an efficient and low-cost temporary heating method is important to the efficacy and overall economics of these systems.

The composition for in-situ remediation of soil or aquifer disclosed for the transesterification of vegetable oil without heating may require days to weeks. Heating the composition further increases the alcoholysis reaction rates. Based on temperature, the time needed is from minutes to hours. Recent field work has demonstrated that the generation of volatile fatty acids by the in-situ alcoholysis reactions without the aid of heat can treat up to 90% of CVOC contaminant mass in the environmental medium within 90 days.

The reaction temperature significantly influences the transesterification reaction. Increasing temperature will increase the rate of reaction of the transesterification reaction. For example, a temperature of 140° F. (90° C.) could produce 94% of the total yield in about 6 minutes versus a yield of 64% at 90° F. (32° C.). However, the reaction temperature should be below the boiling point of the mixture to prevent the evaporation of the alcohol (Abbah et al, 2016).

FIGS. 4*a* through 4*h* illustrates modeling results for a 12 hour injection event of 75 $m^3$ of water heated to 90° C. into 3 injection wells at a flow rate of 150 $m^3$/d for a site located in the Midwest with soil and groundwater impacted with CVOCs. Hydrogeological parameters were:

Site lithology: sand

Porosity: 0.33

Aquifer hydraulic conductivity K of 1×10-2 cm/s.

Hydraulic gradient: 0.002 feet/feet

Temperature modeling results show that the injection of the vegetable oil, the emulsifier, and the water heated to 90° C. into 3 injection wells at a flow rate of 150 $m^3$/d was able to maintain temperatures of greater than 30° C. for 10 days in the vicinity of the injection wells. This is more than enough time to influence and increase the reaction rate for transesterification. The temperature modeling results further show that at this site the temperature in the vicinity of the injection wells remained above 20° C. for 90 days, increasing the reaction rates for contaminant degradation.

Figure 5:
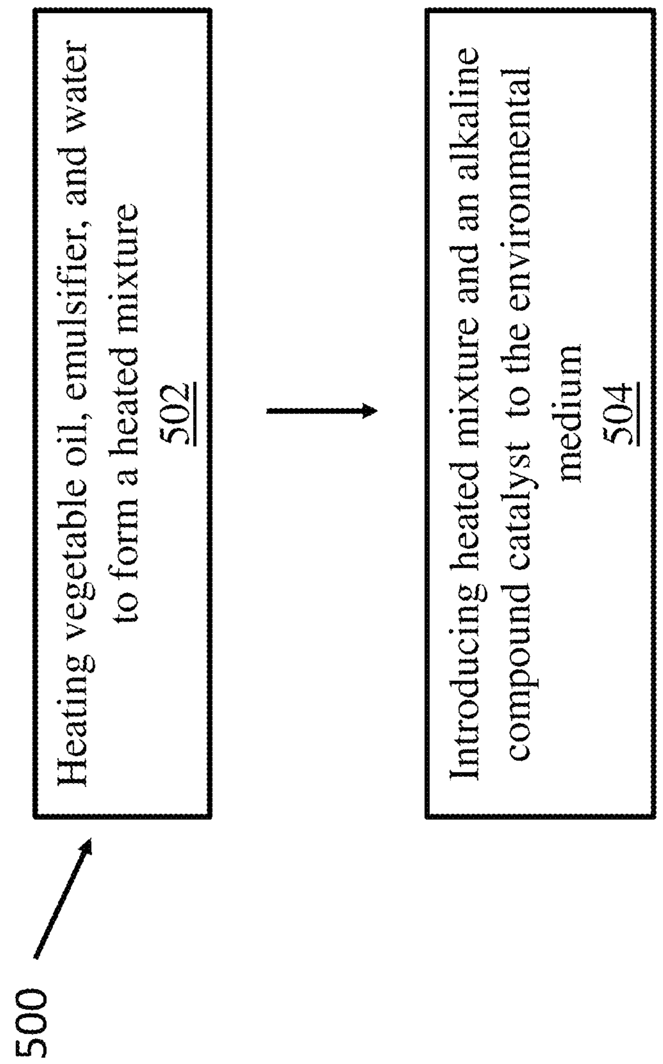
FIG. 5 is a flow chart illustrating a method for in-situ remediation of environmental medium having recalcitrant contaminants.

As shown in FIG. 5, the subject matter illustrates a method (500) for remediation of environmental medium using heat enhanced reductive bioremediation. At step 502, the vegetable oil, the emulsifier, and the water are heated to less than the boiling point of mixture, typically less than 100° C. (212° F.). Step 502 is followed by step 504, where the heated mixture is introduced to the environmental medium along with the alkaline compound catalyst.

In an embodiment, the mixture is heated with the heat source with heat exchanger. The heat source includes at least one hot water boiler, a counter flow hot water generator, a water tube boiler/shell and tube heating tank, a heating tank with electrical coils; solar water heating system with storage tank and solar collector, or a combination as shown in FIGS. 5 through 7.

Figure 6:
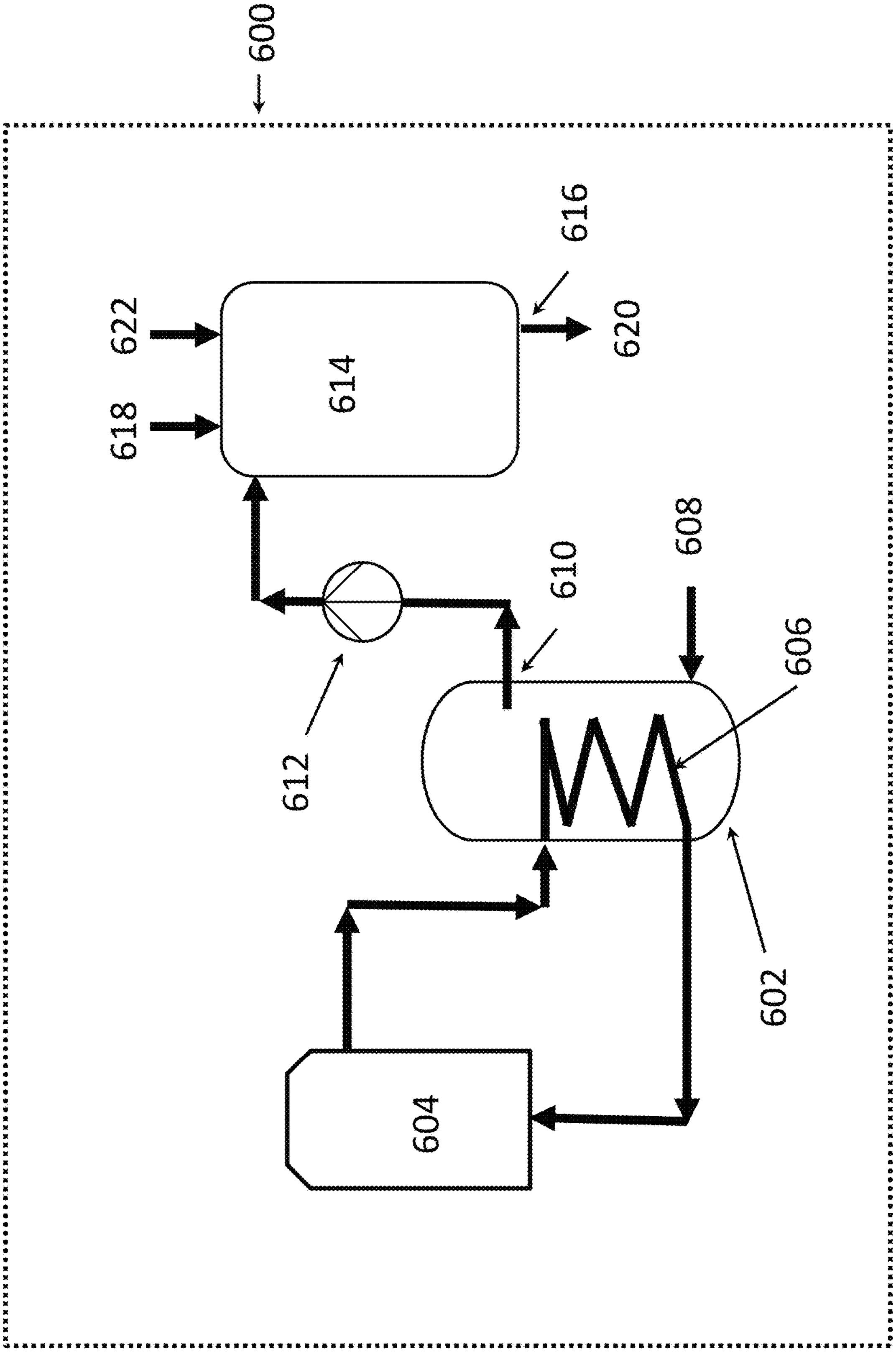
FIG. 6 is a diagrammatic representation of a system used to heat vegetable oil, emulsifier, and water according to an embodiment of the disclosure.
Figure 7:
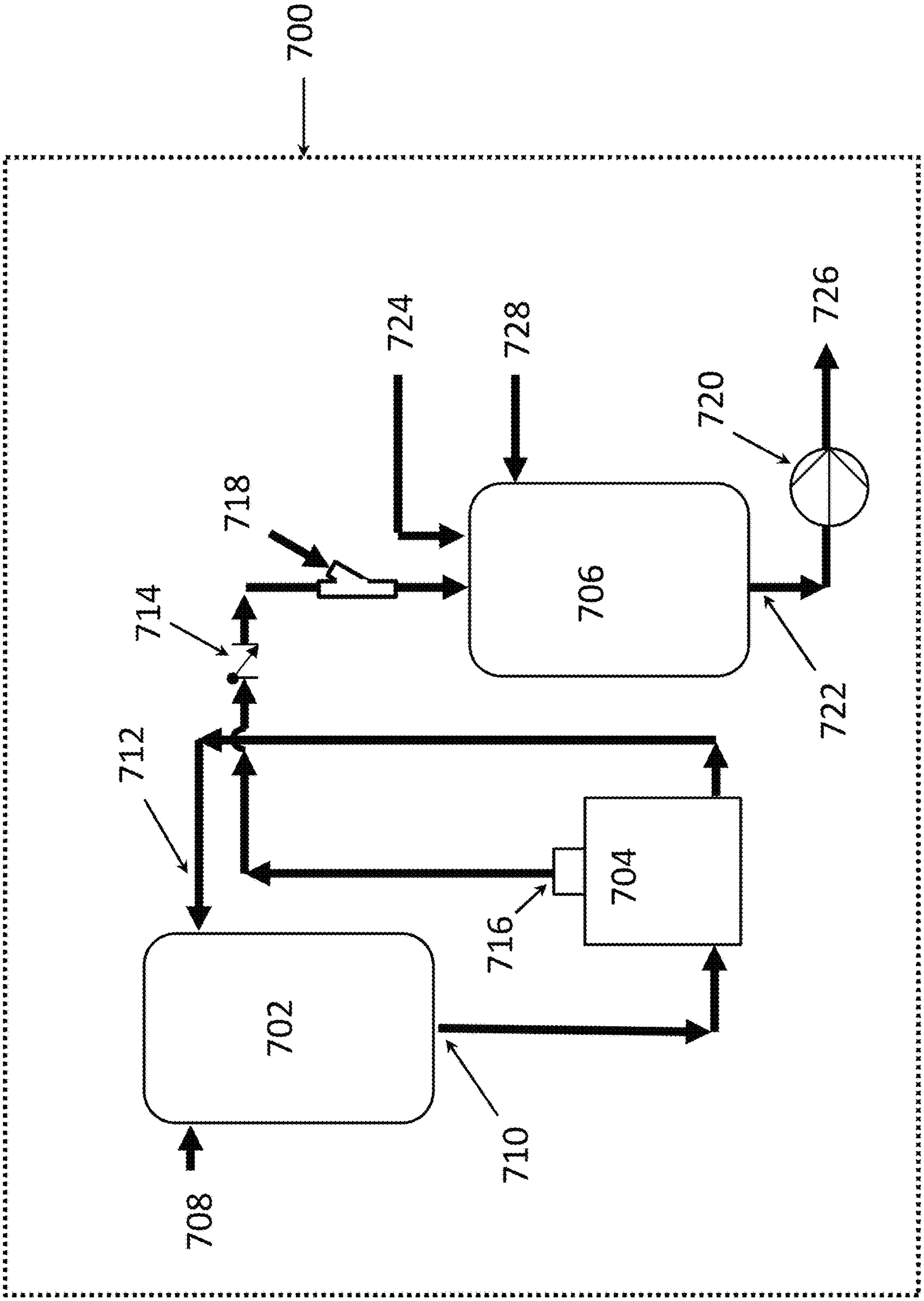
FIG. 7 is a diagrammatic representation of a system used to heat vegetable oil, emulsifier, and water according to an embodiment of the disclosure.

In an embodiment, as shown in FIG. 6, the heat source includes a hot water boiler wherein the hot water boiler is a Low Temperature Hot Water Boiler (LTHW), American Society of Mechanical Engineers (ASME) Section IV heating boiler with a maximum temperature below 250° F. and a maximum pressure below 160 pounds per square gauge (psig); Medium Temperature Hot Water Boiler (MTHW), ASME Section IV or Section I boiler with a temperature, ranging from 250° F. to 350° F., with a maximum operating pressure of 150 psig; or a High Temperature Hot Water Boiler (HTHW), ASME Section I boiler with a maximum temperature exceeding 250° F. and/or maximum pressures exceeding 160 psig, In another embodiment, the alkaline compound catalyst is heated with the mixture comprising a vegetable oil, an emulsifier, water, or combinations thereof in a pressurized system to prevent the evaporation of the alcohol and the heated mixture introduced to the environmental medium.

In another embodiment, the alkaline compound catalyst enables the generation of both soluble and slowly fermenting electron donors required for the anaerobic remediation of organohalide compounds that contaminae the soils and the groundwater. The alkaline compound is introduced to the environmental medium prior to or after introducing the heated mixture.

In an embodiment, the mixture comprises assimilable carbon mixture of a water miscible oil (vegetable oil and emulsifier mixture). The mixture has 80 to 99% of the vegetable oil, wherein the vegetable oil is selected from the group consisting of soybean oil, corn oil, coconut oil, rapeseed oil, canola oil, peanut oil, sunflower oil, olive oil, crambe oil, and mixtures thereof; and 1 to 20% of the emulsifier, wherein the emulsifier is a chemical additive that encourages the suspension of oil in water. The emulsifier may be a surfactant, a co-surfactant, a polymer, or a blend thereof. The surfactant is selected from the group consisting of non-ionic vegetable oil fatty acid esters, ethoxylated surfactants, oleate, and a mixture thereof. The co-surfactant is selected from the group consisting of polyglycerol oleic acid esters, fatty alcohol alkoxylates, and a mixture thereof. The polymer is selected from the group consisting of ethylene glycol polymer and equivalents thereof, and wherein a hydrophile-lipophile balance (HLB) ranges between 6-8 for the surfactant and co-surfactant mixture. The mixture has water.

In an embodiment, the mixture comprises 1 to 25% assimilable carbon and 75 to 99% water.

In an embodiment, the composition has alkaline compounds acting as a catalyst. The alkaline compound is potassium hydroxide or sodium hydroxide. The alkaline compound is dissolved in an alcohol in an amount ranging from 0.1 to 5% of the alkaline compound to the alcohol to form an alkyl oxide solution. In-situ alcoholysis is catalyzed with a homogeneous alkaline compound such as potassium hydroxide (KOH) or sodium hydroxide (NaOH) dissolved in a short-chain alcohol. Short-chain alcohols are selected from the group consisting of methanol, ethanol propanol, butanol, isopropanol, tert-butanol, branched alcohols and octanol and such selection is based on the cost of the alcohol and its reactivity (Yusuf et al., 2011). isopropanol (also known as isopropyl alcohol, 2-propanol, rubbing alcohol, CAS Registry Number: 67-63-0) is an expensive and is least reactive alcohol due to steric hindrance. Accordingly, ethanol and methanol are used.

In an embodiment, at step 504 the mixture is introduced into the environmental medium by placing an injection point, an injection rod, an injection well, a hand-held injection rod, a French drain system, or combination thereof. The mixture is introduced by gravity feeding, an induced gas stream, under pressure, or a combination using at least one pump, at least one blower, at least one compressor, tank, at least one tank of compressed gas, at least one compressed gas tank after a blower or compressor, or a combination thereof. Preferably, step 504 of the above method is performed at a pressure ranging between 10 psig and 4000 psig.

In an embodiment, step 504 is performed by introducing sufficient heated water to the environmental medium to replace 25 to 100% of the total pore volume in the target treatment area. The Pore Volume ($V_{pore}$) is calculated as follows:

$$V_{pore} = \text{Treatment Area} \times \text{Treatment Thickness} \times \text{Effective Porosity}$$

FIG. 6 is a schematic representation of a system 600 for heating a mixture 608 having a vegetable oil, an emulsifier, water or a combination thereof. The system 600 includes a shell and tube heating tank or a batch heating tank 602 with a heat source 604 connected to hot water coils, steam coils, electric heating coils or steam tubes 606 installed in the heating tank 602. The mixture 608 enters the heating tank 602 and the heated mixture 610 exits the heating tank 602. The mixture 608 comprises vegetable oil, emulsifier, and water or combinations thereof. A pump 612 is used to transfer the hot liquid, i.e., the heated mixture 610 to a batch tank 614. The heated mixture 610 (including heated vegetable oil, an emulsifier, and water) is mixed with an alkaline compound catalyst 618. to form the final mixture 616. The final mixture 616 is introduced to the environmental medium 620. The alkaline compound catalyst 618 can be introduced to the environmental medium 620 prior to or after introducing the heated mixture. In some embodiments, additional amendments 622 are added to the batch tank 614 for promoting enhanced anerobic bioremediation before, after, or during the introduction of the heated mixture to the environmental medium 620.

FIG. 7 is another schematic representation of a system 700 for heating a mixture. The system 700 includes a boiler 702, a recirculation tank 704, and a batch tank 706. The boiler 702 has a cold mixture 708, and a heated mixture 710. The heated mixture 710 is sent from the boiler 702 to a recirculation tank 704, and to a recirculation line in 712 from the recirculation tank 704. The purpose of the recirculation tank 704 is for maintaining the temperature. A check valve 714 is located between the recirculation tank outlet (steam) 716 and the assemble carbon and water in 718, The purpose of the check valve 716 is to prevent backflow to the recirculation tank 704. A pump 720 is used to transfer the liquid of the batch tank 706. The heated mixture 722 along with an alkaline compound catalyst 724 is introduced to the environmental medium 726. The alkaline compound catalyst 724 is introduced to the environmental medium 726 prior to or after introducing the heated mixture consisting of vegetable oil, an emulsifier, and water or combinations thereof. In some embodiments, additional amendments 728 are added to the heating tank 706 for promoting enhanced anerobic bioremediation before, after, or during the introduction of the heated mixture to the environmental medium 726.

Figure 8:
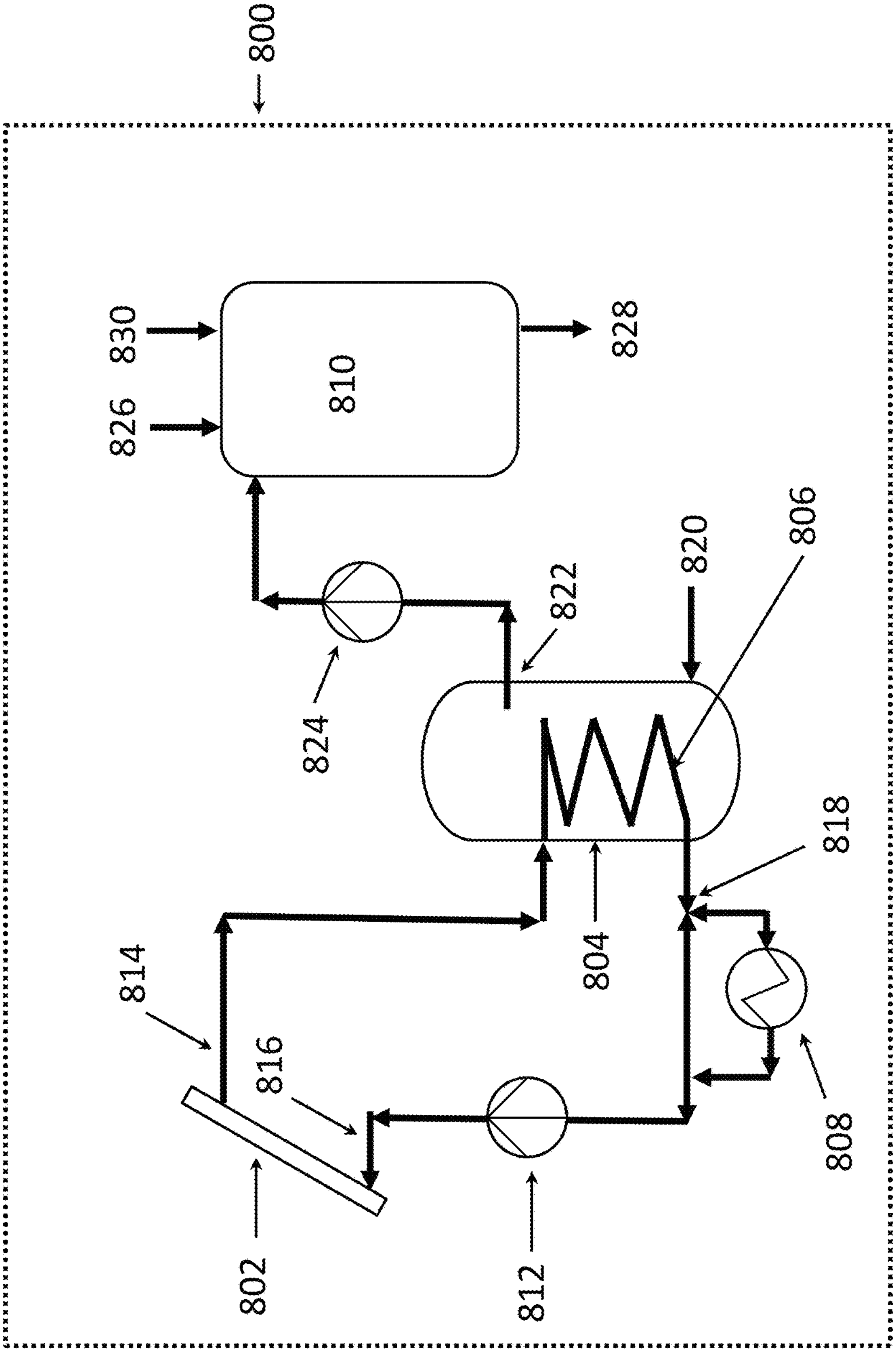
FIG. 8 is a diagrammatic representation of a to heat vegetable oil, emulsifier, and water according to an embodiment of the disclosure.

FIG. 8 is another schematic representation of a system 800 for heating a mixture. The system 800 includes a solar collector 802, a thermal storage tank 804 with a submerged heat exchanger 806, an auxiliary heat exchanger 808 and a batch tank 810. A heat transfer fluid recirculation pump 812 is used to recirculate heat transfer fluid from the solar collector hot out 814 to the submerged heat exchanger 806 in the thermal storage tank 804 and back to the solar collector cold in 816. Between the thermal storage tank 804 and the heat transfer fluid recirculation pump 812 is a two position, three-way valve 818 for diverting heat transfer fluid to an auxiliary heat exchanger 808. The thermal storage tank includes a cold liquid in, i.e., the mixture 820 having vegetable oil, emulsifier, and water or combinations thereof and a hot liquid out 822. A pump 824 is used to transfer the hot liquid out 822, including vegetable oil, an emulsifier, and water, to a batch tank 810. From the batch tank 810, the hot liquid along with an alkaline compound catalyst 826 is in step 504 introduced to the environmental medium 828. The alkaline compound catalyst 826 can be introduced to the environmental medium 828 prior to or after introducing the heated mixture consisting of vegetable oil, an emulsifier, and water or combinations thereof. Depending on the additional amendments, the batch tank 810 can be used for adding additional amendments 830 for promoting enhanced anerobic bioremediation before, after, or during the introduction of the hot liquid is introduced to the environmental medium 828.

Vegetable oils are triglycerides wherein a glycerin (or glycerol) molecule is connected via ester bonds to three fatty acid molecules. When the original ester (a chemical having the general structure R'COOR") is reacted with an alcohol, the process is called alcoholysis. Vegetable oils are hydrophobic and do not mix with water. Water miscible oil (vegetable oil and emulsifier mixture) is thus better suited for aquifer remediation as they are easily distributed in the porous subsurface. These water miscible oil are prepared with the aid of polymers and surfactants that allow vegetable oils to spontaneously phase invert and disperse into a water continuum in the form of small droplets or micelles.

Methanol offers advantages over ethanol for the reaction and preparation of the alkaline catalyst stock solution as its reaction with triglycerides is quick and it is easily dissolved in KOH, the solubility of KOH in methanol is 55 g/100 g (28° C.). Methanol-water systems do not have a minimum boiling point mixture or azeotrope. Methanol is completely miscible in all proportions so the boiling point of the mixture will be somewhere between the boiling points of methanol and water. Ethanol-water systems do have a minimum boiling point mixture or azeotrope near the 95% ethanol mole proportion. The boiling point of this mixture is 78.2° C. In contrast the boiling point of pure ethanol at 78.5° C., and water at 100° C.

Figure 9:
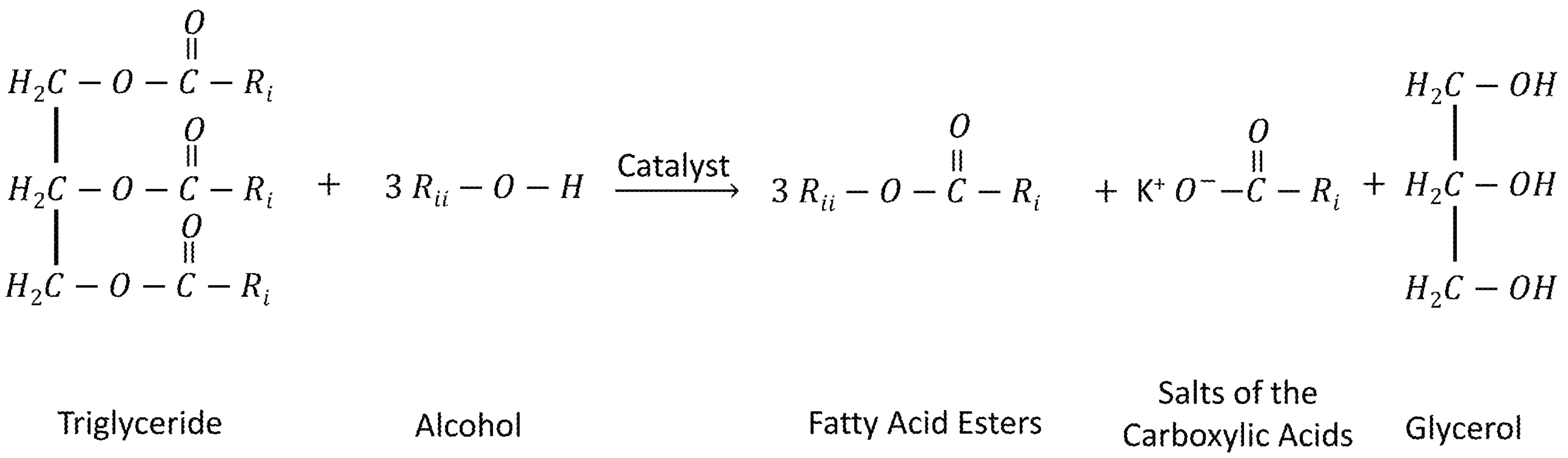
FIG. 9 illustrates transesterification of vegetable oils, reaction of triglyceride with an alcohol in the presence of a strong base, potassium hydroxide (KOH) in accordance with an embodiment of the disclosure.
Figure 10:
FIG. 10 illustrates soaking deposit material (i.e., crud) in water in accordance with an embodiment of the disclosure.
Figure 11:
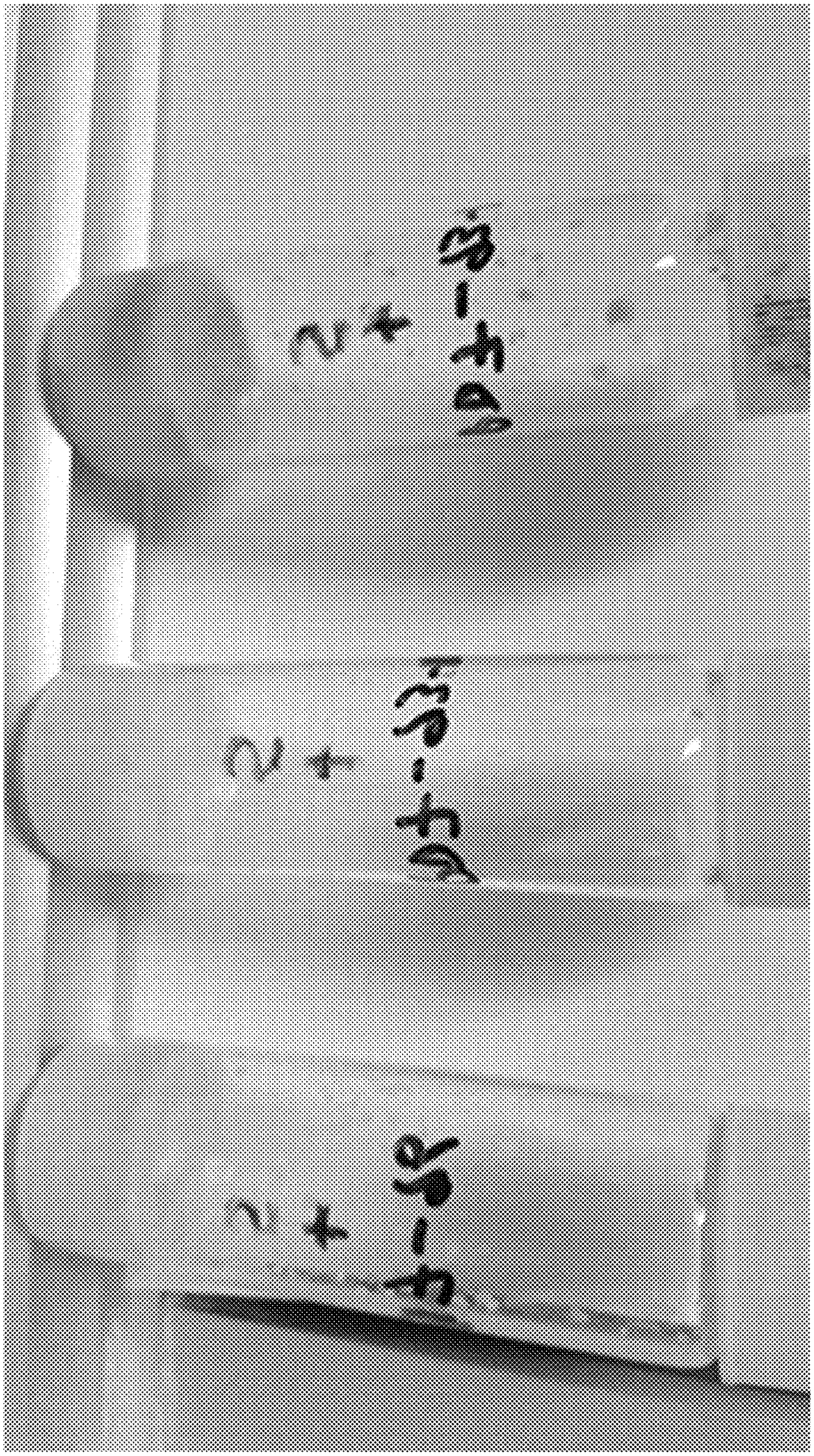
FIG. 11 illustrates soaking deposit material (i.e. crud) in a low dose surfactant mixture (1.8% TASK™ Surfactant) in accordance with an embodiment of the present subject matter.
Figure 12:
FIG. 12 illustrates soaking deposit material in 80% active isopropanol (IPA) in accordance with an embodiment of the present subject matter.
Figure 13:
FIG. 13 illustrates soaking deposit material in 0.01 M sodium hydroxide (NaOH), pH 14, in accordance with an embodiment of the present subject matter.

Potassium hydroxide is the preferred base for the process as it produces salts of carboxylic acids that are easily distributed in the subsurface. Sodium based alkaline compounds such as sodium hydroxide produces a hard soap that clogs the aquifer inhibiting distribution. When the triglyceride is reacted with an alcohol in the presence of a strong base, the fatty acids of the triglyceride molecule are cleaved and attach to the alkyl group of the alcohol to form fatty acid alkyl esters, carboxylic acids/salts and glycerol as shown in FIG. 9.

The use of a premixed methylate (also known as methoxide) is the preferred catalyst for use at contaminated sites. Methylate solution can produce higher yields, requiring less catalyst. They also improve safety due to lower exposure to corrosive dust.

In another embodiment, the composition provides a solvent present in an amount ranging from 10 to 60% and a water miscible oil (vegetable oil and emulsifier mixture) present in an amount ranging from 40 to 90%. Organic solvents like hexane, alcohol, chloroform or petroleum ether are commonly used for dissolving oils or lipids. An alcohol is namely primary and secondary monohydric aliphatic alcohol comprising 1 to 8 carbon atoms (Ma et al., 1999). Alcohols such as ethanol and isopropanol are miscible with water. The solubility of soybean oil in ethanol at 40° C. is 20.4% and, in isopropanol at 20° C., 45.1%. The alcohol is thus a vegetable oil solvent that serves as a substrate shuttle for in-situ bioremediation. The solvent preferably used in the present subject matter is isopropanol (CH3CH2CH2OH). The mixture of an alcohol with a vegetable oil and an emulsifier is more readily dispersible than EVO in aquifers and the subsurface by advection. An easy-to-distribute substrate means that an injection point can create greater radii of influence (ROI) which in turns reduces the required number of injection points to adequately supply a contaminated aquifer with electron donor. In other words, a larger volume of substrate can be dispersed from a single injection point.

For in-situ remediation, isopropanol thus provides the following benefits as a substrate shuttle for vegetable oil:

- At high concentrations, it aids in rehabilitation of injection wells and subsequent biofouling protection
- It is an excellent source of organic carbon and hydrogen (i.e., a good electron donor)
- At 20° C., it can dissolve about 45% vegetable oil
- It aids in sequestering chlorinated solvents, temporarily reducing high (inhibitory to microbial degradation) groundwater solvent concentrations. Chawla et al., reported that a nontoxic co-solvent such as isopropanol can be used to solubilize TCE, removing a major barrier to in-situ biological degradation. After testing three co-solvents, namely isopropanol, ethanol and methanol alcohols, 50% isopropanol solution performed the best, solubilizing all of available TCE (9,900 ppm) (Chawla et al., 2001).
- It optimizes a long-lasting electron donor by liquefying vegetable oils into very small particles
- It allows a more efficient surfactant-use, effectively reducing emulsifier requirements.

In a further embodiment, the remediation method further comprises introducing additional materials for promoting an environment for enhanced anaerobic bioremediation, said additional-materials comprising at least one of a zero-valent metal, iron sulfide reagents, vitamins, a yeast-extract, biological cultures and mixtures thereof. More preferably biological cultures are introduced after the environmental medium has reached a temperature of less than 40 to 45° C.

In an embodiment, the composition is used for removal of contaminants defined by at least one of:

- recalcitrant organic contaminants selected from the group consisting of halogenated straight-chain and aromatic hydrocarbons;
- nitrates;
- oxidized metals such as hexavalent chromium (Cr[VI]), selenium (VI), and uranium (VI); organic chlorate and perchlorate derivatives;
- explosives such as nitroaromatics, nitramines, nitrate esters, and energetic munitions residuals nitrates; or
- a combination thereof.

In yet another embodiment, the above method further includes a step by adding the heated mixture targeted area by deep tilling or mechanical mixing of soils.

In yet another embodiment, the above method relates to a step by adding the heated mixture to open excavation or trench prior to backfilling.

Contaminants in a non-aqueous phase partition or solubilize into the above disclosed composition upon contact which aids in creating favorable conditions for bioremediation as contaminant dissolved phase concentrations decrease from otherwise inhibitory levels. The uniqueness of the composition for in-situ remediation allows ease of subsurface distribution with minimum aquifer permeability, losses and biofouling typically associated with the injection of EVO and other long-lasting electron donors. Another remediation benefit of this subject matter is the pH buffering capacity preventing the creation of acidic conditions that inhibit biodegradation of contaminants. The composition neutralizes aquifer acidity, fatty acids generated during fermentation, and acid generated from reductive dichlorination thus enabling maximum biodegradation rates.

The method of remediation involves heating water and heating an engineered water-soluble oil or water miscible oil (vegetable oil and emulsifier mixture) and adding an alkaline compound catalyst to groundwater to promote the formation of fatty acid alkyl esters, carboxylic acid salts and glycerol. The microorganisms in groundwater use the formed products (fatty acid alkyl esters, carboxylic acid salts and glycerol) as electron donors during reductive biological processes that turn contaminants into innocuous derivatives. Illustratively, the self-emulsifying oils are natural seed oils (vegetable oils) mixed with surfactants and polymers. Fermentation reactions thus take place on excess organic material, generating in turn hydrogen that allows anaerobic biological processes that reduce oxidized contaminants such as halogenated compounds to innocuous end products. The reaction produces long-lasting electron donors, fatty acid esters, and water-soluble electron donors, carboxylic acids and glycerol that are easy to distribute in the subsurface by advection. The properties allow increasing the ROI and reducing the required number of injection points as larger volumes of substrate could be dispersed from a single injection point by using the present composition. Having described the basic aspects of the present subject matter, the following non-limiting examples illustrate specific embodiments and example evaluation-results of the present subject matter.

The method of remediation further includes adding a solvent (isopropanol) miscible with water and vegetable oil to form a solution. In an example, a series of tests showed that isopropanol can serve to increase an aquifer's permeability previously reduced by biofouling or the formation of crud after EVO injections. Experiments with crud samples from fouled injection wells included exposing them to surfactants, isopropanol or to high pH at room temperature. FIG. 3 shows the received crud samples. FIGS. 10 through 13 show various treatment methods. As evidenced by the experiment, isopropanol dissolved the deposit material that created permeability losses and damaged the injection wells.

Figure 14:
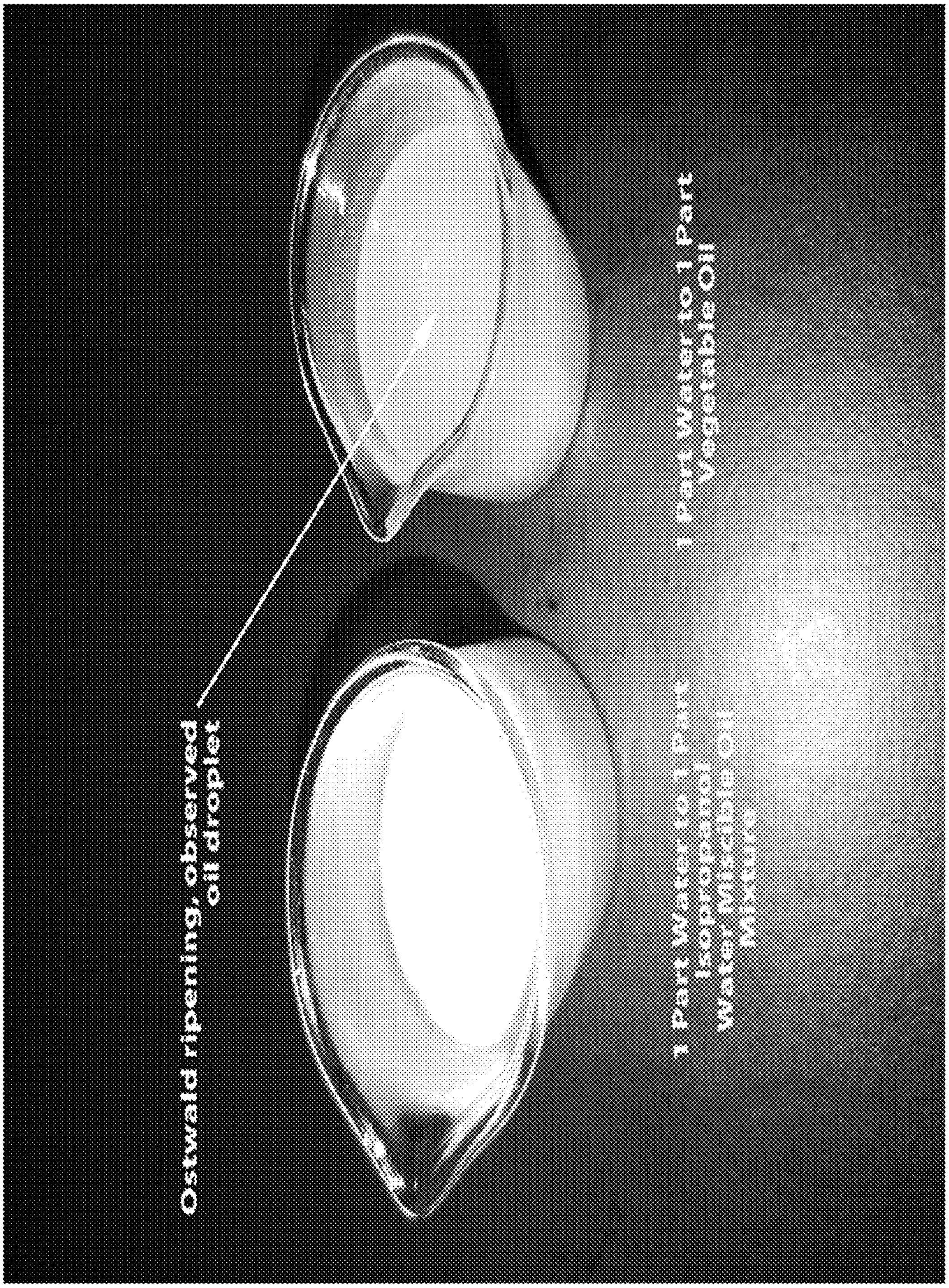
FIG. 14 illustrates emulsion comparison for of isopropanol and vegetable oil to isopropanol and water miscible oil in accordance with an embodiment of the present subject matter.

In an example, an evaluation was performed comparing mixtures of isopropanol and vegetable oil to isopropanol and water miscible oil (vegetable oil and emulsifier mixture) at ratios of 3:2. The addition of the isopropanol lowered the viscosity of both mixtures and the mixtures seemed Newtonian in character (i.e., shear stress from mild mixing did not appear to reduce the viscosity of the mixture). Water was next added at 1:1 ratio to simulate dilution prior to a subsurface injection event. In the vegetable oil-alcohol emulsion, alcohol is the polar phase and vegetable oil is the nonpolar phase. These types of emulsions enable the incorporation of water-and insoluble oil into the emulsion. The isopropanol/vegetable oil mixture spontaneously formed a white cloudy emulsion. In a short period of time, the sample exhibited Ostwald ripening as observed in FIG. 14 which shows oil droplets creaming out and floating to the top of the sample. Over the course of the day, the oil layer increased in size. The isopropanol/water miscible oil (vegetable oil and emulsifier mixture) sample spontaneously emulsified and exhibited pseudoplastic behavior. In other words, the apparent viscosity decreased after adding shear stress from mild mixing with a glass stir bar. The addition of polymers and surfactants thus improved product handling for in-situ remediation processes and effective subsurface distribution.

In an example, potassium hydroxide (a strong base) serving as a homogeneous alkaline compound, was dissolved separately in methanol and ethanol to prepare a catalyst stock solution of 0.1 to 5% alkaline compound to alcohol as shown below. The effective species of catalysis was the methoxide radicals ($CH_3O^-$) or the ethoxide radicals ($CH_3CH_2O^-$).

$KOH+CH_3OH \rightleftharpoons K^+ +^- OCHCH_3+H_20$ Potassium Methoxide (Potassium Methylate)

$KOH+CH_3CH_2OH \rightleftharpoons K^+ +^- OCH_2CH_3+H_20$ Potassium Ethoxide (Potassium Ethanolate)

As shown in FIG. 9, the stoichiometric ratio requires 3 moles of alcohol per mole of triglyceride which would be about 10% by volume for methanol. Thus, double or triple the stoichiometric ratio, i.e., 6:1 to 9:1 moles of alcohol to triglyceride, was used to shift the equilibrium constant and favor the forward reaction to obtain more amount of product. Excess alcohols further serves as soluble electron donors to aid in anaerobic reductive bioremediation. Alkyl oxide solutions of potassium methoxide ($KOCH_3$) in methanol, (CAS Number 865-33-8 in 67-56-1), or potassium ethoxide ($KOCH_2CH_3$) in ethanol, (CAS Number 865-33-8 in 64-17-5), were used as preferred catalysts.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for-purposes of example rather than limitation, and does not preclude inclusion of such modifications, variations, and/or additions to the present subject matter as would be readily apparent to one of ordinary skill in the art.

To the extent that method or apparatus embodiments herein are described as having certain numbers of elements, it should be understood that fewer than all of the elements may be necessary to define a complete claim. In addition, sequences of operations or functions described in various embodiments do not require or imply a requirement for such sequences in practicing any of the appended claims. Operations or functions may be performed in any sequence to effectuate the goals of the disclosed embodiments.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the forthcoming claims.

We claim:

1. A method for treating an environmental medium, the method comprising:

heating a mixture aboveground with a heat source to a temperature below a boiling point of the mixture, wherein the mixture is heated to a temperature of about 90° C., wherein the mixture comprises a vegetable oil, an emulsifier, and water; and injecting the mixture into the environmental medium at a flow rate of at least 150 $m^3$/d to produce an injection event having an area of at least 75 $m^3$, wherein the injection event area has a temperature of greater than 30° C. for at least 10 days without additional heating; and introducing an alkaline compound catalyst into the environmental medium, wherein the alkaline compound catalyst comprises from 0.1 to 5 wt. %, relative to the total weight of the catalyst, of potassium hydroxide, sodium hydroxide, or a mixture thereof, and an alcohol.

2. The method as claimed in claim 1, wherein the alkaline compound catalyst is introduced to the environmental medium prior to or after introducing the heated mixture.

3. The method as claimed in claim 1, wherein the alkaline compound catalyst is heated and introduced in a pressurized system to prevent an evaporation of the alcohol.

4. The method as claimed in claim 1, wherein the treating the environmental medium comprises treating the environmental medium comprising at least one of recalcitrant organic contaminants selected from the group consisting of halogenated straight-chain and aromatic hydrocarbons, nitrates, oxidized metals, organic chlorate and perchlorate derivatives, explosives, and a combination thereof, wherein the oxidized metals comprise hexavalent chromium (Cr [VI]), selenium (VI), and uranium (VI), and wherein the explosives comprise nitroaromatics, nitramines, nitrate esters, and energetic munitions residuals nitrates.

5. The method as claimed in claim 4, further comprising converting the recalcitrant organic contaminants comprising halogenated straight chain hydrocarbons into non-toxic byproducts comprising ethane and a chloride through biogeochemical processes.

6. The method as claimed in claim 1, wherein the heat source with the heat exchanger comprises a hot water boiler, a counter flow hot water generator, a water tube boiler, a shell and tube heating tank, a heating tank with electrical coils, a solar water heating system with storage tank and a solar collector, or a combination thereof.

7. The method as claimed in claim 6, wherein the hot water boiler is a Low Temperature Hot Water Boiler (LTHW), American Society of Mechanical Engineers (ASME) Section IV heating boiler with a maximum temperature below 121.1° C. and a maximum pressure below 160 pounds per square gauge (psig), a Medium Temperature Hot Water Boiler (MTHW), ASME Section IV or Section I boiler with a temperature ranging from 121.1° C. to 176.7° C., and with a maximum operating pressure of 150 psig, a High Temperature Hot Water Boiler (HTHW), ASME Section I boiler with a maximum temperature exceeding 121.1° C. and a maximum pressure exceeding 160 psig.

8. The method as claimed in claim 1, wherein the vegetable oil is selected from the group consisting of soybean oil, corn oil, coconut oil, rapeseed oil, canola oil, peanut oil, sunflower oil, olive oil, crambe oil, and a mixture thereof.

9. The method as claimed in claim 1, wherein the emulsifier comprises a surfactant, a co-surfactant, a polymer, or a blend thereof, wherein the surfactant is selected from the group consisting of non-ionic vegetable oil fatty acid esters, ethoxylated surfactants, oleate, and a mixture thereof, wherein the co-surfactant is selected from the group consisting of polyglycerol oleic acid esters, fatty alcohol alkoxylates, and a mixture thereof, and wherein the polymer is ethylene glycol polymer and equivalents thereof; and wherein a hydrophile-lipophile balance (HLB) ranges between 6-8 for the surfactant and co-surfactant mixture.

10. The method as claimed in claim 1, wherein the mixture added to the environmental medium comprises 75 to 99% water, and wherein the vegetable oil and emulsifier are in a weight ratio in a range of 4:1 to 99:1.

11. The method as claimed in claim 1, wherein introducing the mixture to the environmental medium is carried out by placing an injection rod or an injection well into the environmental medium and introducing the mixture by gravity feeding, by an induced gas stream, under pressure, or a combination thereof.

12. The method as claimed in claim 11, wherein introducing the mixture is performed at a pressure in a range of 5 psig to 4,000 psig.

13. The method as claimed in claim 1, wherein the environmental medium comprises soil.

14. The method as claimed in claim 1, wherein the alcohol is selected from the group consisting of ethanol, methanol, and a mixture thereof.

15. The method as claimed in claim 1, further comprising adding at least one of a zero-valent metal, iron sulfide reagents, vitamins, a yeast-extract, biological cultures, and a mixture thereof.

16. The method as claimed in claim 1, wherein heating the mixture to temperature of 90° C. results in 94% of a total yield in about 6 minutes.

17. The method as claimed in claim 1, wherein heating the mixture increases transesterification of the vegetable oil by about 50% in about 90 days.

18. The method as claimed in claim 1, wherein the mixture is injected into the the environmental medium at the flow rate of 150 $m^3$/d.

19. The method as claimed in claim 1, wherein the environmental medium is contaminated with halogenated volatile organic compounds.

20. A method for treating an environmental medium, the method comprising:

heating a mixture aboveground with a heat source to a temperature below a boiling point of the mixture, wherein the mixture is heated to a temperature of about 90° C., wherein the mixture comprises a vegetable oil, an emulsifier, and water;

injecting the mixture into the environmental medium at a flow rate of at least 150 $m^3$/d and in an amount to replace 25% to 100% of a total pore volume ($V_{pore}$) of the environmental medium with the mixture, the total pore volume being calculated according to the following equation:

$$Vpore=\text{Treatment Area}\times\text{Treatment Thickness}\times\text{Porosity};$$

wherein the injection event area has a temperature of greater than 30° C. for at least 10 days without additional heating; and introducing an alkaline compound catalyst into the environmental medium, wherein the alkaline compound catalyst comprises from 0.1 to 5 wt. %, relative to the total weight of the catalyst of potassium hydroxide, sodium hydroxide, or a mixture thereof, and an alcohol.

* * * * *